United States Patent [19]

Ishibashi et al.

[11] Patent Number: 5,927,318
[45] Date of Patent: Jul. 27, 1999

[54] AUTOMATED PIPE CONNECTION APPARATUS

[75] Inventors: Hiroki Ishibashi; Mieko Katoh; Kazumi Shima, all of Chiba, Japan

[73] Assignee: Toyo Engineering Corporation, Tokyo, Japan

[21] Appl. No.: 08/737,324

[22] PCT Filed: Feb. 14, 1996

[86] PCT No.: PCT/JP96/00311

§ 371 Date: Oct. 15, 1996

§ 102(e) Date: Oct. 15, 1996

[87] PCT Pub. No.: WO96/25621

PCT Pub. Date: Aug. 22, 1996

[30] Foreign Application Priority Data

Feb. 15, 1995 [JP] Japan .................................. 7-026724

[51] Int. Cl.[6] .............................. B08B 9/06; F16K 1/44; F16K 51/00
[52] U.S. Cl. ........................ 137/240; 137/241; 137/312; 137/614.18; 137/627; 134/95.1; 134/98.1; 134/99.1; 134/166 C; 134/167 C; 141/85; 141/91; 222/148
[58] Field of Search ........................ 137/240, 241, 137/312, 614.17, 164.18, 614.19, 625.11, 627, 884; 134/94.1, 95.1, 98.1, 99.1, 166 C, 167 C, 171; 53/168, 425, 426; 14/85; 141/90, 91; 222/148

[56] References Cited

U.S. PATENT DOCUMENTS

| | | |
|---|---|---|
| 3,145,930 | 8/1964 | Herklotz ................................. 137/240 |
| 3,240,225 | 3/1966 | Barrows ................................. 137/240 |
| 3,716,191 | 2/1973 | Knight ................................. 137/241 |
| 4,617,955 | 10/1986 | Melgaard ............................... 137/240 |
| 4,687,015 | 8/1987 | Mieth ................................... 137/240 |
| 4,757,834 | 7/1988 | Mieth ................................... 137/240 |
| 5,127,429 | 7/1992 | Kempf ................................... 137/240 |
| 5,188,134 | 2/1993 | Satoh et al. ............................ 137/240 |
| 5,226,449 | 7/1993 | Zimmerly ............................... 137/240 |
| 5,353,830 | 10/1994 | Mochizuki et al. ...................... 137/240 |
| 5,390,694 | 2/1995 | Zimmerly et al. ....................... 137/240 |

*Primary Examiner*—George L. Walton
*Attorney, Agent, or Firm*—Knobbe, Martens, Olson & Bear, LLP

[57] ABSTRACT

Disclosed is an automated pipe connection apparatus having an automated connection apparatus main body (1) capable of performing automated change-over between a group of pipelines and another group of pipelines, a washing/sterilizing utility block (2), and a drainage block (3). In particular, the automated pipe connection apparatus is provided with caps (111,112,114,115) for preventing intrusion of sundry bacteria into couplers (A1,A2,B1,B2) on standby and for performing washing and/or sterilization operation and also with washing- and/or sterilizing-purpose couplers (AWL,BWL).

The apparatus according to this invention is superior in the operability for washing and sterilization and in the prevention of intrusion of sundry bacteria.

7 Claims, 18 Drawing Sheets

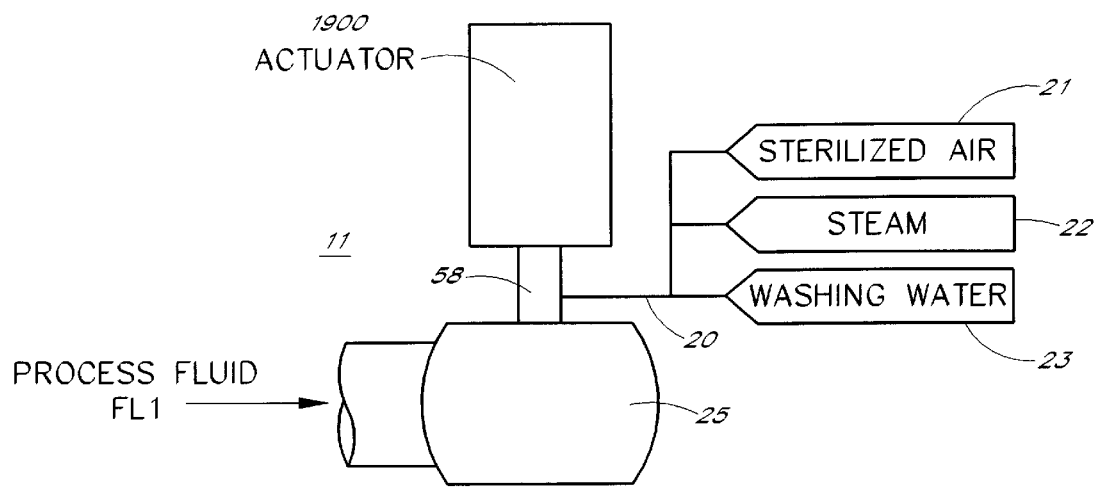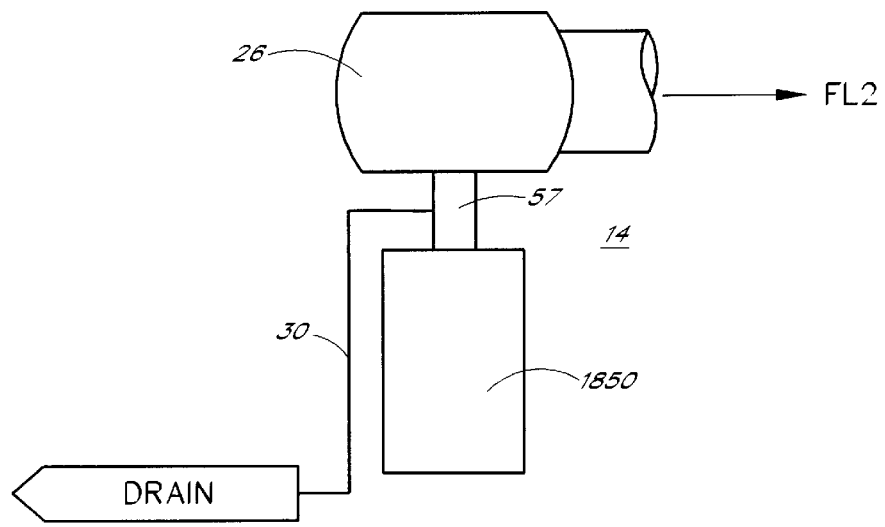
FIG. 3

AUTOMATED PIPE CONNECTION APPARATUS

This is a U.S. patent application of International Application No. PCT/JP96/00311 under 35 U.S.C. § 371.

TECHNICAL FIELD

This invention relates to an automated pipe connection apparatus for a piping change-over station, and specifically to an automated pipe connection apparatus for a piping change-over station in which piping employed, for example, in a batchwise production system is changed over to transfer raw materials, a final product, an intermediate product and the like.

BACKGROUND ART

In a batchwise production system, transfer of fluids such as raw materials and a product (an intermediate product or a final product) has heretofore been conducted primarily by a transfer system which makes use of fixed pipes and requires changing-over operation of one or more valves. To transfer an intermediate product from a group of plural tanks in a step to another group of plural tanks in another step as needed, for example, in a food or drink production plant, this transfer is carried out by arranging a group of fixed header pipes and changing over the pipes, namely, performing changing-over operation of valves. A system constructed of a header and valves as described above is accompanied by problems such as loses of the raw materials and the product remaining in the pipes and mixing of a fluid of a different kind (cross contamination).

Fields which involve such changing-over of product species include, for example, fields such as foods, pharmaceuticals, fine chemicals and the like.

In the food production field, for example, washing is conducted to avoid contamination or the like due to possible rotting of an intermediate product remaining in piping whenever the piping is changed over. It is the common practice to effect this washing by washing product-contacted portions with washing water while maintaining a piping facility in a fixed state without disassembly, movement and the like of production facilities, that is, by the so-called cleaning-in-place (hereinafter abbreviated as the "CIP") method. Accordingly, directional control valves of a complex construction have heretofore been used for changing over from transfer of a product to washing and vice versa.

Further, for example, in the pharmaceutical and biotechnology-related fields, sterilization is conducted in addition to a CIP washing operation to ensure sterility whenever piping is changed over. It is the common practice to effect this sterilization by the sterilization-in-place (hereinafter abbreviated as the "SIP") method, that is, by causing a high-temperature fluid, for example, steam or the like to act on product-contacted portions while maintaining a piping facility in a fixed state without disassembly, movement and the like of production facilities. To effect changing-over among transfer of a product, washing and sterilization, it has hence been needed to employ a more complicated piping construction and many valves.

For sanitation, it is also necessary to permit easy disassembly of these valves. Further, as their material, corrosion-resistant stainless steel is used and moreover, their surfaces are smoothened by surface treatment. Valves of this type are therefore costly. For a changing-over station, valves are needed as many as the product of the number of pipes in one group by the number of pipes in another group. Use of pipes in a large number therefore leads to a substantial increase in cost.

In Japanese Patent Applications Nos. 21252/1992, 125812/1992, 315207/1992 and 214034/1993, the present inventors have therefore proposed changing-over systems with a view to overcoming such a situation.

The systems proposed in these applications are of a type such that in which desired pipes can be connected together as needed without construction of such a fixed grid-like valve block as in the conventional system shown in FIG. 15.

For example, an automated pipe connection changeover apparatus disclosed in Japanese Patent Application No. 214034/1993 will be described with reference to FIG. 16. When two groups of pipelines are connected together as shown in the drawing, a group of movable carriage cells arranged adjacent to each other as many as the pipelines in one of the pipe groups with lengths thereof extending in parallel with each other is designated as a unit A, while another group of movable carriage cells arranged adjacent to each other as many as the pipelines in other pipeline group with lengths thereof extending at right angles relative to the lengths of the movable carriage cells in the group of the unit A is indicated as a unit B. Individual movable carriage cells in the unit A are provided with movable carriages, respectively, said carriages being connected to the corresponding pipelines in the one pipeline group via flexible pipes, so that the movable carriages are movable in directions of the lengths of the associated movable carriage cells. Pipe couplers connected to end portions of the respective flexible pipes are assembled in the movable carriages, respectively, and when the movable carriages move in the corresponding movable carriage cells, end faces of the respective pipe couplers are caused to move along a common single imaginary plane.

Likewise, in the unit B, movable carriages connected to the corresponding pipelines in the other pipeline group via flexible pipes are also movable in directions perpendicular to the directions of movement of the movable carriages in the unit A so that end faces of pipe couplers assembled in the respective movable carriages are movable along a common single imaginary plane.

The unit A and unit B of the above-described construction are arranged with their imaginary planes extending opposite to each other in a mutually-parallel relationship. Accordingly, the movable carriages in the unit A and those in the unit B move at right angles relative to each other. Each movable carriage is provided with its corresponding pipe coupler. This pipe coupler is connected to its associated flexible pipe which is connected at an opposite end thereof to one of the pipelines which make up the corresponding pipeline group. Responsive to a command for a combination, the corresponding movable carriages are moved to predetermined positions by their associated drive units and are connected together. Owing to the construction as described above, the pipe couplers in the unit A and unit B are moved to desired positions by their movable carriages and then connected together. Flow passages are therefore established between the pipes in the one pipeline group and those in the other pipeline groups via the flexible pipes, respectively. It is therefore possible to perform a connection changing-over operation between the pipeline group connected to the unit A and that connected to the unit B in accordance with combinations of the individual movable carriages.

Use of a system, such as that disclosed in Japanese Patent Application No. 214034/1993 referred to above, as a connection change-over system has made it possible to flexibly respond changing-over of products. Changing-over in fields where washing and sterilization are indispensable and important however still involves the following problems.

(1) After washing, the pipe couplers are disconnected and remain exposed to the air. There is hence the potential problem that sundry bacteria may deposit on the pipe couplers.

(2) Unless the pipes are internally sterilized subsequent to washing, there is also the potential problem that bacteria may proliferate there.

DISCLOSURE OF THE INVENTION

An object of the present invention is therefore to provide an automated pipe connection apparatus which, in a field requiring washing and sterilization, a) pipes are physically isolated from each other so that mixing of a product of a different kind is completely eliminated, b) washing and/or sterilizing operations can be performed by flexibly combining them in accordance with the level of sanitation required for each product, c) connection of pipelines can be changed over in plural combinations at the same time, and d) there is no potential problem of intrusion of sundry bacteria through seal portions of couplers even during a standby time.

In one aspect of the present invention, there is thus provided an automated connection apparatus comprising:

automated connection means for changing over connection between (A) a pipeline group composed of plural pipelines having movable carriages at one end portions thereof and (B) another pipeline group composed of plural pipelines having movable carriages at one end portions thereof, said automated connection means being, as will be defined below under [I] and [II], provided with:

[I] a unit A having movable carriage cells arranged side by side as many as said pipelines in said pipeline group (A) in a mutually adjacent relationship with lengths thereof extending in parallel with each other, whereby a plane is formed by said movable carriage cells, and a unit B having movable carriage cells arranged as many as said pipelines in said pipe group (B) with lengths thereof extending in a mutually parallel relationship in a direction perpendicular to said lengths of said movable carriage cells in said unit A, whereby another plane is formed by said movable carriage cells, said unit A and said unit B being arranged at a predetermined interval therebetween in a mutually-opposing relationship so that said two planes extend in parallel with each other, each of said movable carriage cells in said unit A being provided with a movable carriage reciprocally in a direction of said length of said movable carriage cell along said one plane, each of said movable carriage cells in said unit B being provided with a movable carriage reciprocally in a direction perpendicular to said length of said movable carriage cell in said unit A, each of said movable carriage cells being provided with a flexible pipe and a drive unit for moving said movable carriage to position the same at a desired position in said direction of said length of said corresponding movable carriage cell, each of such flexible pipes being connected at one end thereof to a coupler of said corresponding movable carriage, each of said units being provided with at least one movable carriage equipped with a washing- and/or sterilizing-purpose coupler, one of said movable carriages connected to each other, being provided with an automated connection device for the couplers, opposite ends of such flexible pipes in each of said unit A and unit B being fixedly arranged in the order of arrangement of said movable carriage cells in a plane, which extends substantially in parallel with the direction of arrangement of said movable carriage cells and is located at a height different from that of said plane of said unit, and forming an end portion of said unit, and

[II] combinations of the following couplers IIa and IIb:

(IIa) couplers individually provided with a pressure shell defining an opening of fluid-passing portion and another opening having a valve seat portion, an internal valve to open or close the fluid-passing portion which is disposed opposite said valve seat portion and having a seal member for providing sealing between said valve seat portion and said internal valve, internal-valve drive means disposed on an extension of a stem of said internal valve, a washing/sterilization chamber arranged in said stem of said internal valve, and a washing-fluid nozzle arranged in a free end portion of said washing/sterilization chamber, and (IIb) couplers individually provided with a pressure shell defining an opening of fluid-passing portion and another opening having a valve seat portion, an internal valve to open or close the fluid-passing portion which is disposed opposite said valve seat portion, having a seal member for providing sealing between said valve seat portion and said internal valve and arranged opposite said internal valve of said corresponding coupler described above under (IIa), internal-valve drive means disposed on an extension of a stem of said internal valve, and a flow passage formed in said stem of said internal valve to externally discharge washing and/or sterilizing fluid from said corresponding coupler described above under (IIa), utility feeding means for washing and/or sterilizing said couplers and pipe groups in said automated connection means, and drainage means for discharging effluent produced as a result of washing and/or sterilization;

said movable carriages of said pipeline group (A) being provided with said couplers in one (IIa or IIb) of said coupler combinations [II] whereas said movable carriages of said pipeline group (B) being provided with said couplers in the other one (IIb or IIa) of said coupler combinations, respectively, thereby enabling pipe connection between said two pipe groups, utility pipes from said utility unit being connected to washing and/or sterilizing chambers of said couplers arranged in the respective movable carriages of said automated connection means, openings of said washing- and/or sterilizing-purpose couplers, and a first group of caps which may be arranged on said movable carriages of said automated connection means, said first group of caps being arranged for downward connection to couplers having discharge flow passages for washing and/or sterilization fluid;

said drainage means accumulating waste water, which is produced by washing and/or sterilization operations, via a second group of caps arranged for upward connection to couplers having washing and/or sterilization chambers therein, said second group of caps being optionally arranged on the respective movable carriages of said automated connection means, couplers having discharge flow passages for washing and/or sterilization fluid and discharge ports of washing- and/or sterilizing-purpose couplers, and said first group of caps and said second group of caps being applicable to their corresponding couplers when said couplers are not connected together.

A control system for the automated pipe connection apparatus may comprise a host computer for performing control on combinations of the pipelines and conditions for operations including CIP and SIP and a terminal computer (sequencer or the like) for controlling transfer of the movable carriages, combination of the couplers and transfer of fluids such as sterilized air, steam and washing water for CIP or SIP.

By conducting so-called production control, decision of transfer of a material to the next step or change-over from one product to another makes it possible to determine pipe combinations to be ordered to the pipe connection changeover station, whereby through the host computer, a transfer sequence can also be determined as to tank contents and/or a transfer sequence of fluids, determination of transfer routes and an operation sequence of valves can also be controlled.

Operated next is a system for controlling movements of desired movable carriages and connections thereof. Here, the direction in which each desired movable carriage is to be moved and the position to which the movable carriage is to be moved are controlled, and further work is also performed to confirm if the connections have been made precisely.

It is desired to construct these control systems as distributed systems because the automated pipe connection system can be easily constructed in the form of units and has good expandability.

Connection between the unit A and the unit B in the automated connection means, which constitutes the automated pipe connection apparatus according to the present invention, is achieved by disconnecting a desired one of the movable carriages in the unit A from the associated cap, moving the movable carriage to a predetermined position, disconnecting a desired one of the movable carriages in the unit B from the associated cap, moving the movable carriage to a predetermined position to locate the couplers, which are arranged in the respective movable carriages, in a face-to-face relation, and then connecting these couplers with each other by the automated connection device arranged on the side of the unit B, whereby a desired fluid transfer route is established. In this manner, connection of pipes in a desired combination can be achieved or connection of pipes in desired plural combinations can be simultaneously attained.

Before disconnecting the couplers from each other, CIP and SIP operation of the connected surfaces can be performed next. After the disconnection, connection is made with the washing- and/or sterilizing-purpose coupler to permit internal washing and sterilization of each pipe. Subsequent to completion of the internal washing and/or sterilization, the coupler returns to its home position and is fitted with the cap.

In this manner, coupler portions whose washing and/or sterilization have heretofore been unachievable insofar as the couplers are connected together can be effected. After the completion of the washing and/or sterilization, the couplers can be kept in a germ-free state, for example, by maintaining them under a positive pressure with sterilized air until the next pipe connection change-over is performed.

BRIEF DESCRIPTION OF THE DRAWINGS

FIG. 3 is a block diagram illustrating one example of a pipe connection mechanism in the automated pipe connection apparatus according to the present invention;

BEST MODE FOR CARRYING OUT THE INVENTION

Figure 1:
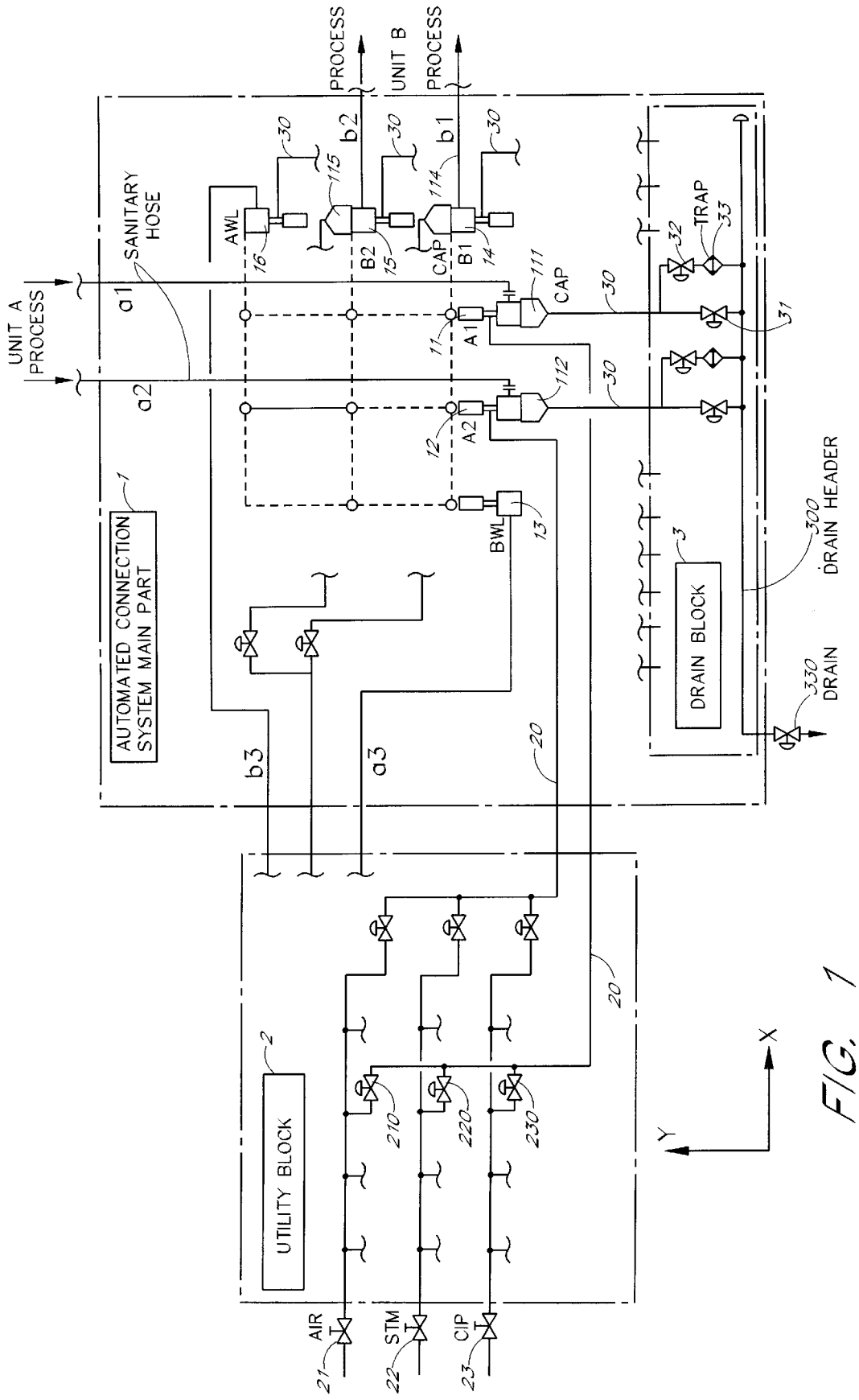
FIG. 1 is a schematic illustration showing the overall system construction of an automated pipe connection apparatus according to a first embodiment of the present invention as connected at home positions.

FIG. 1 is a schematic illustration showing the overall arrangement of the sterilizable, automated pipe connection apparatus according to the present invention.

The sterilizable, automated pipe connection apparatus is constructed of an automated connection means 1, a utility block 2 and a drain block 3.

Automated Connection Means 1

Unless there is a special mention below, the automated connection means 1 is arranged horizontally.

Figure 2:
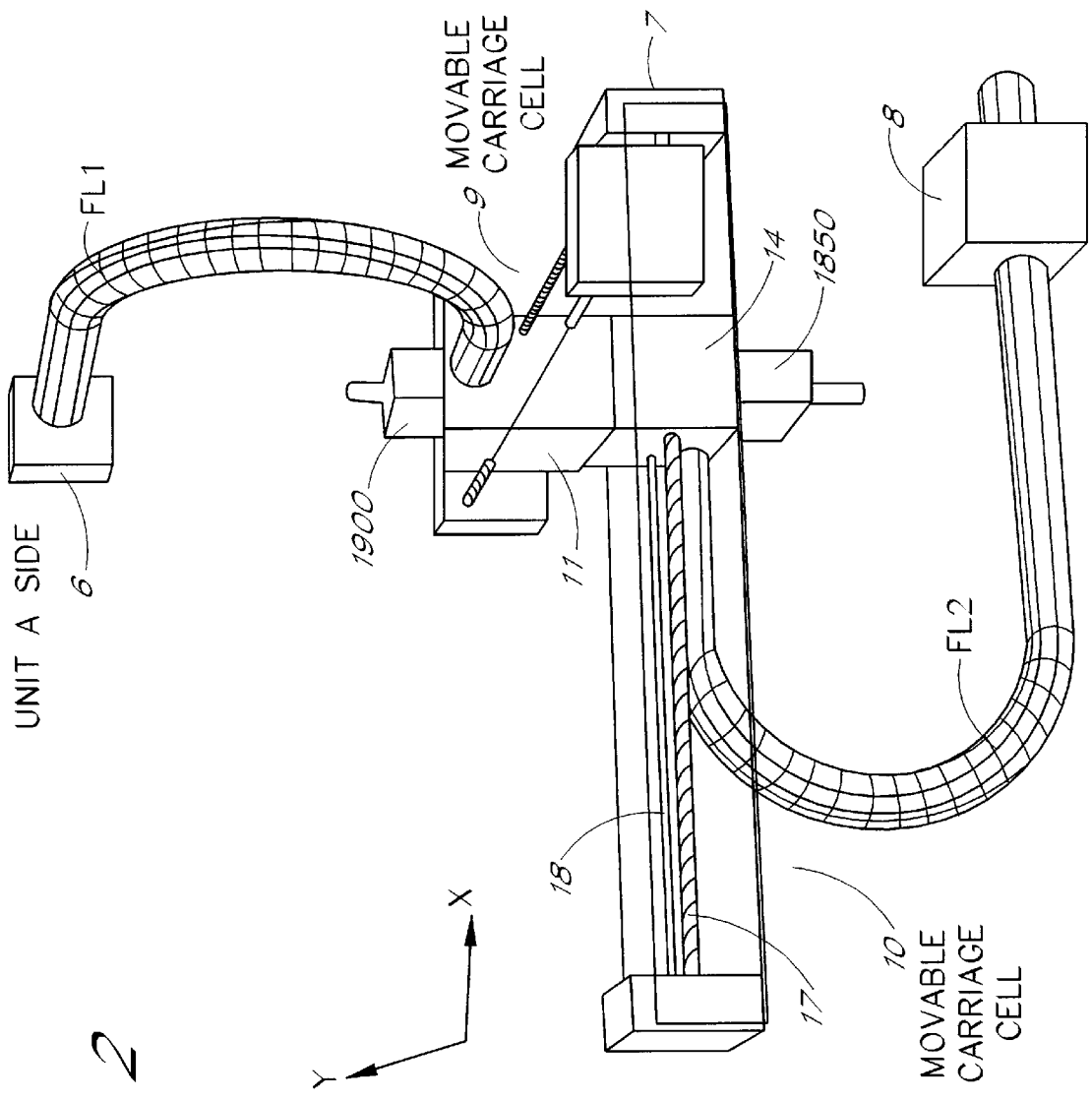
FIG. 2 is a schematic illustration showing one example of a connection mechanism in the automated pipe connection apparatus according to the present invention.

As is illustrated in FIG. 2, the automated connection means 1 is composed of the unit A having flexible pipes FL1 movable only in a direction of a Y-axis and the unit B having flexible pipes FL2 movable only in a direction of an X-axis at right angles relative to the unit A. The overall automated connection means is constructed by arranging both the units opposite to each other at a predetermined interval therebetween so that moving directions of movable carriages in both the units become perpendicular to each other.

Both the units are disposed horizontally so that they are located in an up-and-down positional relation. The units A,B are each provided with drive units 7 for driving their corresponding movable carriers arranged as many as the associated flexible pipes. Each drive unit 7 forwardly terminates in a threaded shaft 17. Threadedly mounted on the threaded shaft 17 is a movable carriage 11 (or 12) or 14 (or 15) as a flexible-pipe-end moving portion. Each drive unit 7 may comprise, for example, a motor. The threaded shaft is provided, at an end portion thereof connected to the drive unit and an opposite end portion thereof, with journal bearings, respectively. A movable carriage cell 9 and another movable carriage cell 10 are constructed as described above.

Such movable carriage cells 9 are arranged as many as the flexible pipes in a row in the direction of X-axis to form a single plane, whereby the unit A on one side of the automated connection means is constructed. On other hand, such movable carriage cells 10 are arranged as many as the flexible pipes on the side of the unit B in a row in the direction of Y-axis to form another single plane, whereby the other unit B of the automated pipe connection means is obtained.

It is to be noted that each flexible pipe is fixed at one end thereof above or below its corresponding movable carriage cell and is connected at the opposite end thereof to the corresponding movable carriage. Each flexible pipe is therefore arranged to take a U-shaped form to a horizontal direction within its corresponding movable carriage cell. In association with each flexible pipe, one movable carriage cell can be constructed and arranged. As such flexible pipes, flexible hoses are practical. Their material can be chosen in view of properties of fluids which flow inside them, use conditions (pressure, temperature, etc.), safety and the like. Hoses which are free of liquid holdup and have high cleanliness are used especially for fields such as pharmaceutical industry and biotechnology.

In each unit, the flexible pipes are fixed at their corresponding hose-end fixing portions 6 or 8 arranged above or below the associated movable carriage cells 9 or 10 in order to prevent them from getting entangled. In unit A, the movable carriages 11 as the hose-end moving portions are movable only in the direction of Y-axis and the opposite end portions are arranged fixedly in the direction of X-axis. In the unit B, on the other hand, the flexible pipes are movable only in the direction of X-axis while the opposite end portions thereof are arranged fixedly in the direction of Y-axis. The flexible pipes are therefore prevented from getting entangled. Entangling is prevented by reducing the movement freedom of the flexible pipes as described above.

The movable-carriage moving mechanism, which is arranged in each movable carriage cell described above, comprises of one or more guide means for guiding movements of the movable carriage, internal threads formed in side walls of the movable carriage and the externally-threaded shaft 17 maintained in threaded engagement with the internal threads, and the drive unit 7 for rotating the externally-threaded shaft, said drive unit being typified by a motor. Such a movable-carriage moving mechanism can be constructed, for example, of a stepping motor or servomotor and a threaded shaft (practically, a ball screw, a trapezoidal screw thread or the like) and is well-known in the present automation technology. By the motor and, if necessary, a feedback mechanism, the movable carriage which is the flexible-pipe-end moving portion and is maintained in threaded engagement with the associated threaded shaft can be accurately positioned. Needless to say, a timing belt or a rack-pinion mechanism, for example, can be used instead of the threaded shaft. To cause the movable carriage to move linearly, the threaded shaft 17 and a guide rod 18 are needed as a screw portion for converting a rotary motion into a linear motion and as guide means, respectively.

In the above description, motors are used by way of example. In place of moving mechanisms by electrical energy, positioning can be conducted by pneumatic energy, specifically, by pneumatic cylinders. Inside the movable carriage cells with these positioning mechanisms built therein, the flexible-pipe-end moving portions (movable carriages) are moved in the unit A and unit B so that they can be brought to mutually-opposing positions.

The automated connection means 1 constructed as described above is combined with the utility block 2 and the drain block 3.

For example, as shown in FIGS. 1 and 2, connected to the unit A of the automated connection means via the fixed hose ends are three pipes in total, that is, process pipes a1,a1 connected to tanks of predetermined raw materials or intermediate products and a pipe a3 connected to a washing- and/or sterilizing-purpose coupler BWL (13) which can be connected to a washing liquid, steam or sterilized air to wash and/or sterilize the pipes in the unit B.

On the other hand, connected to the unit B via the corresponding fixed hose ends are plural pipes in total, specifically three pipes in total in this embodiment, that is, plural pipes with free ends thereof connected, for example, to filling machines, specifically two process pipes b1,b2, and a pipe b3 connected to a washing- and/or sterilizing-purpose coupler AWL (16) which can be connected to a washing liquid, steam or sterilized air to wash and/or sterilize the pipes in the unit A.

The unit A and the unit B are each provided with the movable-carriage drive units, which are arranged as many as the associated pipes. No limitation is imposed on the number of process pipes in each unit upon practice of the present invention, although the number of the process pipes is two in each of the units in this embodiment.

As is illustrated in FIG. 1, both the movable carriages A1(11),A2(12) connected to the pipes a1,a2, said movable carriages also indicating the couplers arranged in the movable carriages, are arranged so that when the movable carriages are located at their home positions, the movable carriages are located at the height of the plane on the side of the unit B and are connected with second caps 111,112 disposed at positions which are located opposite the movable carriages, respectively.

Like the side of the unit A, both the movable carriages B1(14),B2(15) connected to the pipes b1,b2 are arranged so that when the movable carriages are located at their home positions, the movable carriages are located at the height of the plane on the side of the unit A and are connected with second caps 114,115 disposed at positions which are located opposite the movable carriages, respectively. It is also possible to fix the positions of the caps 114,115 and to use, as home positions of the movable carriages B1(14),B2(12), positions to which only the movable carriages are moved for connection with the caps, respectively.

Couplers

Figure 4:
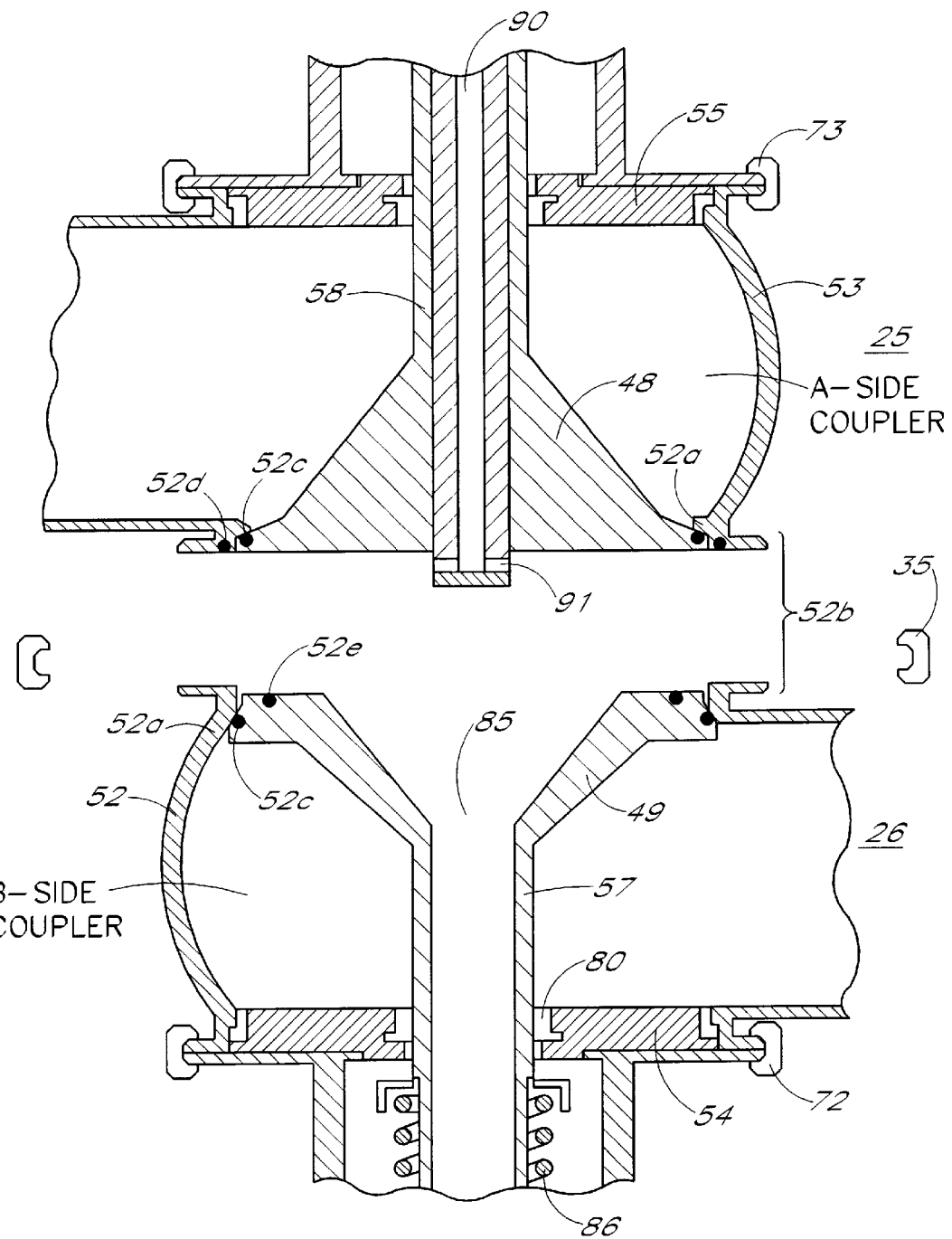
FIG. 4 is a schematic cross-sectional view of couplers having high washability and employed in the automated pipe connection apparatus before connection according to the present invention.

FIGS. 3 and 4 are cross-sectional views of one examples of couplers 25,26, which have excellent washability and are incorporated in each movable carriage in the unit A and each movable carriage in unit B, respectively. FIG. 3 illustrates connections to the utility line and the drain line, respectively, whereas FIG. 4 shows interiors of the couplers in cross-section before connection.

In this embodiment, the coupler 25 is arranged in the unit A while the coupler 26 is disposed in the unit B. They can be reversed without any problem.

The coupler 26 on the side of the unit B comprises a lower spherical shell portion 52 as a whole and a valve element 49 arranged inside the lower shell portion. The spherical shell is provided at an upper part thereof with a valve seat 52a for ensuring sealing between the spherical shell and an outer edge portion of the valve element. The valve element 49 which is centrally arranged in the spherical shell (lower shell portion) 52 is in the form of a funnel. This shape is to ensure a smooth flow of a fluid.

Owing to these shapes of the spherical shell 52 and the valve element 49, a sufficient flow area is assured for the smooth flow of the fluid even when the valve element is brought into an open position. Further, these shapes can also eliminate flow discontinuation and holdup of the liquid and assures good washability.

The valve element is provided in an outermost periphery thereof with an O-ring 52c for ensuring sealing between the valve element and the valve seat 52a. This O-ring is made of a sealing material having flexibility. A valve stem 57 which is located at a central part of the valve element extends downwardly through a lower end plate 54 of the spherical shell, so that the valve stem projects out of the spherical shell.

It is preferred to form the shell portion into such a spherical shell from the standpoints of resistance to pressures, a reduction in weight and the assurance of a flow area around the valve element upon actuation of the valve.

In a bottom part of the spherical shell 52 as a main body, the lower end plate 54 is fixed by a fixing clamp 72. The lower end plate 54 centrally defines an opening through which the valve stem 57 extends. A sealing member 80 is arranged on a peripheral edge portion of the opening to prevent liquid leakage.

Further, a flange having a tapered fee edge portion, namely, a bevel portion 52b is formed on an outer side of the valve seat 52a. As will be described subsequently herein, this bevel portion is employed for the purpose of clamping when the lower coupler is mechanically fastened with the upper coupler.

The valve element 49 is provided in an upper surface thereof with a seal 52e at a position inner than a seal of the upper coupler 25 to establish sealing between the upper surface of the valve element 49 and an lower surface of a valve element 48 of the upper coupler 25.

The valve stem 57 centrally extends through the lower spherical coupler 26, and the valve stem 57 is provided on a lower end portion thereof with a spring 86 for automatically closing the valve 49 and a spring unit 1800 accommodating the spring therein. The valve stem 57 defines a discharge port for CIP and/or SIP, to which a drain pipe is connected.

A description will next be made as to the other coupler arranged in combination for connection with the one coupler of the above-described construction, that is, the coupler 25 on the upper side, namely, on the side of the unit A.

The valve element 48 is centrally arranged in the upper coupler 25 which is in the form of a spherical shell as a whole. The valve element 48 is formed integrally with an upper valve stem 58. The valve stem 58 is provided at an upper end portion thereof with an internal valve drive actuator 1900 as drive means for the internal valve. Although not shown in the drawings, a portion through which the valve stem 58 and the actuator 1900 are connected to each other is arranged between the actuator and the spherical shell. This valve stem 58 is also provided with a feed port which is in communication with the washing and sterilizing utility block 2 to feed sterilized air 21, steam 22 and washing water 23 to be delivered to a free end of the valve element 48.

The valve element 48 is configured to have a substantially reversed T shape and is provided in an outermost periphery thereof with a seal 52c to establish sealing between the valve element 48 and the valve seat 52a of the upper coupler 25.

An O-ring 52d is arranged in a lower part of the valve seat 52a to enable formation of a sealed flow passage upon connection of the upper coupler with the lower coupler. Needless to say, this sealing member is made of a flexible material.

An upper end plate 55 is integrated with the spherical shell with a clamp 73.

The valve stem 58 has a double-wall structure so that the valve stem is concentrically and internally provided with a washing and sterilization chamber 90 which is in communication with utility pipes of washing water, steam and sterilized air. A nozzle 91 is formed at a free end of the chamber to radially spray out washing water and steam flowed through an internal space of the chamber. The washing and sterilization chamber 90 is arranged internally of the valve stem 58 and is located somewhat downwardly of the same plane, whereby washing and sterilization of the upper and lower couplers, including the seals and the sealed surfaces, and discharge of effluent can be effectively accomplished. The nozzle 91 which is formed at the free end of the washing and sterilization chamber 90 is provided with small holes which are arranged at adequate intervals or outwardly. The washing water, steam or the like which has been delivered under pressure is discharged to the outside through a funnel-shaped central release space 85 of the lower coupler 26 and a drain pipe (not shown) arranged underneath the space 85.

Similarly to the lower coupler, the upper spherical shell 53 is provided at a lower part thereof with a bevel portion 52b which is adapted for mechanical locking purpose. The upper coupler and the lower coupler are mechanically locked together by a clamp 35.

The valve stem 58 is connected at the upper end portion thereof with the internal valve drive actuator 1900. The upper valve element 48 is brought into integral contact with the lower valve element 49 and is downwardly moved further. Provided as internal valve drive means for the lower coupler is the spring unit 1800 with the spring 86 accommodated therein in a state biased to permit an automatic return.

It is to be noted that the up-and-down positional relationship is not specifically definite in the above description and can be reversed as needed.

Although no particular limitation is imposed on the material of the above-described couplers, stainless steel is often used in fields where pharmaceutical products are dealt with. Further, surfaces with which fluids are brought into contact are finished by buffing and electrolytic polishing in many instances.

The coupler of the movable carriage A1(11) on the side of the unit A and the coupler of the movable carriage B1(14) on the side of the unit B are connected together by a connecting drive unit 1850 in FIG. 2 which is arranged on the side of the unit B. Although the connecting drive units are arranged on side of the unit B in FIG. 2, it should be born in mind that the present invention is not limited to this arrangement and the connecting drive unit can obviously be disposed on the side of the unit A. A pneumatic cylinder with a return spring accommodated therein is often used as this connecting drive unit. The connecting drive unit is however not necessarily limited to such a pneumatic cylinder and as an alternative, an electric motor can also be used as needed.

Connection Method of the Couplers

A description will hereinafter be made as to a method for changing over connection of pipes, which are connected to the unit A and the unit B, respectively, via the above-described couplers by using the automated connection apparatus to perform delivery of a product or the like as well as washing and sterilization.

Figure 5:
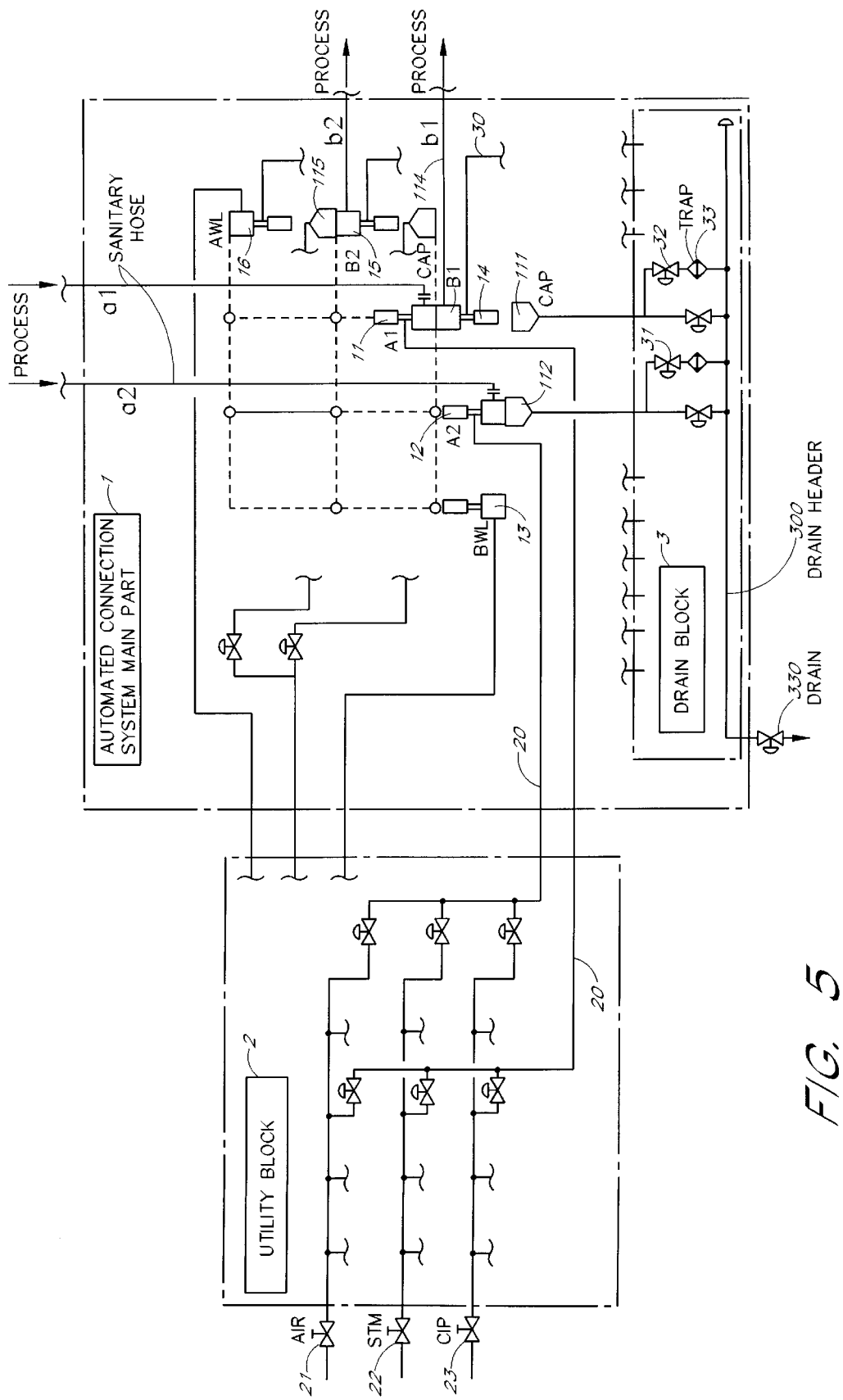
FIG. 5 is a schematic layout of the automated pipe connection apparatus according to the first embodiment of the present invention upon connection of a pipe A1 with a pipe B1.

For example, FIG. 5 is an overall connection diagram for delivering a product of a tank, which is connected to the pipe a1 on the side of the unit A, to the pipe b1 on the side of the unit B.

When the movable carriage A1(11) is at the home position, the coupler of the movable carriage A1(11) is capped with the cap 111 for the coupler of the pipe A1 by an unillustrated drive unit (FIG. 1). Prior to a movement, this capping is canceled. Next, the movable carriage A1(11) of the unit A is moved in the direction of the length thereof by the drive unit to position it at a desired location. Likewise, the coupler of the movable carriage B1(14) is capped with the cap 114 for the coupler of the pipe B1 by an unillustrated drive unit (FIG. 1). Prior to a movement, this capping is canceled. The movable carriage B1(14) on the side of the unit B is then moved in the direction of the length thereof by the drive unit to position it at a desired location. Thus, the coupler of the movable carriage A1(11) and that of the movable carriage B1(14) are positioned at locations where they are facing each other. Next, the coupler of the movable carriage A1(11) and that of the movable carriage B1(14) are connected together by the drive unit 1850 arranged on the side of the movable carriage B1(14).

Upon performing this connection, there are used a guide mechanism for facilitating centering and an appropriate displacement absorption mechanism for absorbing a centering error. These mechanisms are however not illustrated in the drawings because they are similar to those employed for conventional couplers. For example, a mechanism which is commonly employed as such a guide mechanism is to use a tapered cone or guide pin and a guide hole, each of which has an inclined surface. As such a displacement absorption mechanism, there is a mechanism in which the couplers are supported as a whole via a free bearing so that the couplers are horizontally slidable.

After the centering has been achieved by a guide mechanism and displacement absorption mechanism such as those described above, the couplers are finally pressed against each other. This applies an adequate seating pressure to the O-ring 52d (FIG. 4 and FIG. 6) so that the couplers are brought into a state ready for being sealed. By fastening the bevel portions together with the clamp 35 in this state, the couplers are mechanically held, that is, locked together. This clamping can be achieved by automatically closing a half clamp which is used for fastening sanitary parts or devices. As the bevel portions 52b are tapered, use of the clamp 35, which is also tapered, for the fastening can obtain a large fastening force, namely, seating pressure by a small force owing to the wedging effect. Accordingly, the clamping can be achieved by a small force even when the pressure of a fluid is high.

In this embodiment, mechanical locking is effected by the clamp 35. Depending on the size of the couplers, the pressure of the fluid, or the like, sufficient sealing may be achieved by simply applying a force under which the O-ring 52d, which is located at the contact surfaces where the upper and lower couplers are maintained in contact with each other, is sufficiently pressed between the upper and lower couplers. In this case, neither mechanical locking by a clamp nor bevelling of connected portions of couplers is needed.

To communicate the pipe a1 to the pipe b1, the internal valve drive actuator 1900 arranged in association with the coupler of the movable carriage A1(11) is then operated. This internal valve is set to normally assume a closed position by the spring; and is set to assume an open position when fed, for example, with air.

Figure 6:
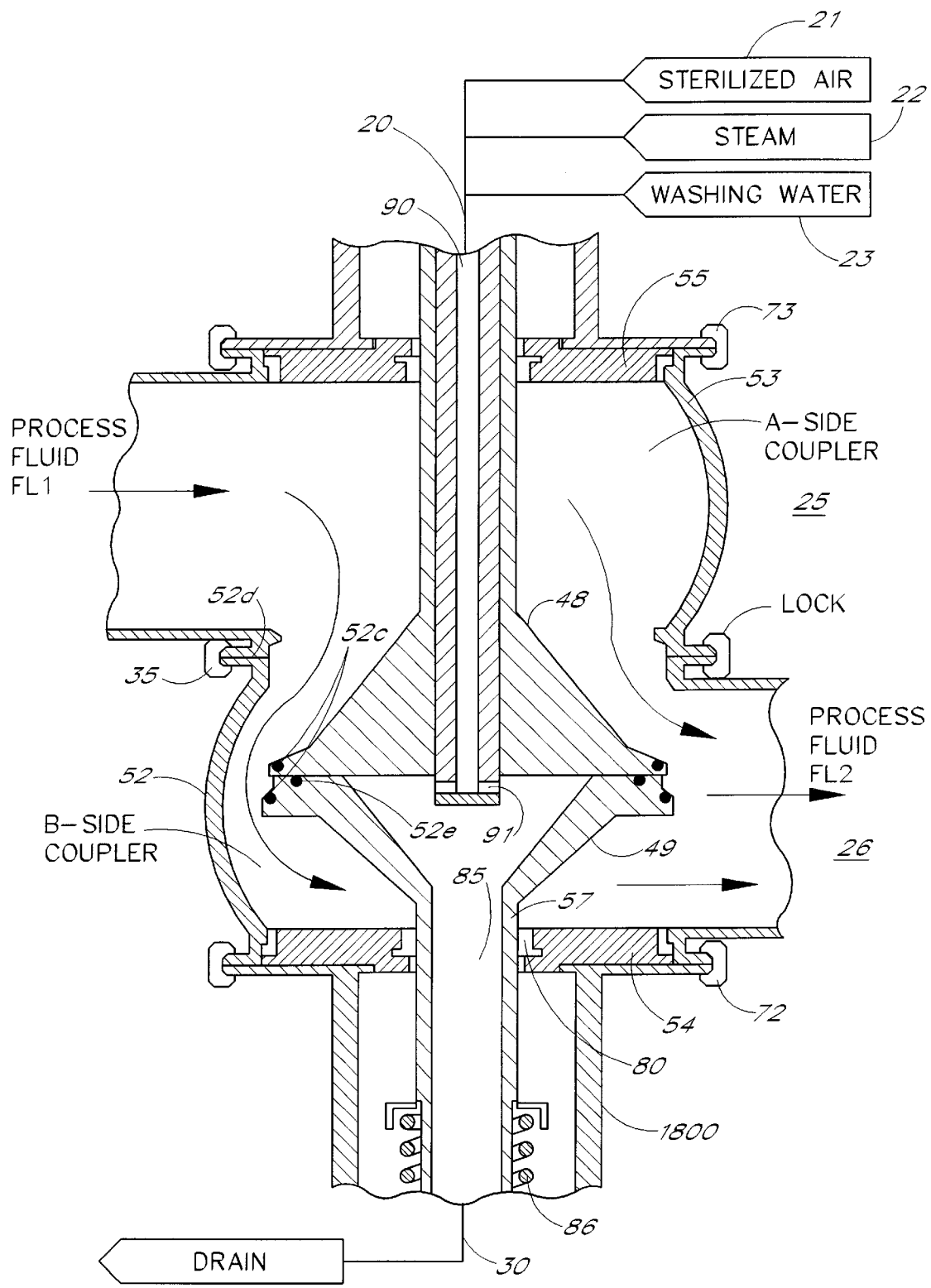
FIG. 6 is a schematic cross-sectional view illustrating a state in which a fluid is flowing as a result of connection between a coupler on a side of a unit A and a coupler on a side of a unit B in the automated pipe connection apparatus according to the first embodiment of the present invention.

FIG. 6 illustrates a situation in which the valve element 48 on the side of the upper coupler 25 has been operated and is hence in an open position. Described specifically, the valve element 48 descends to further press down the valve element 49 of the lower coupler 26. As a result, a fluid flow passage is formed.

Figure 7:
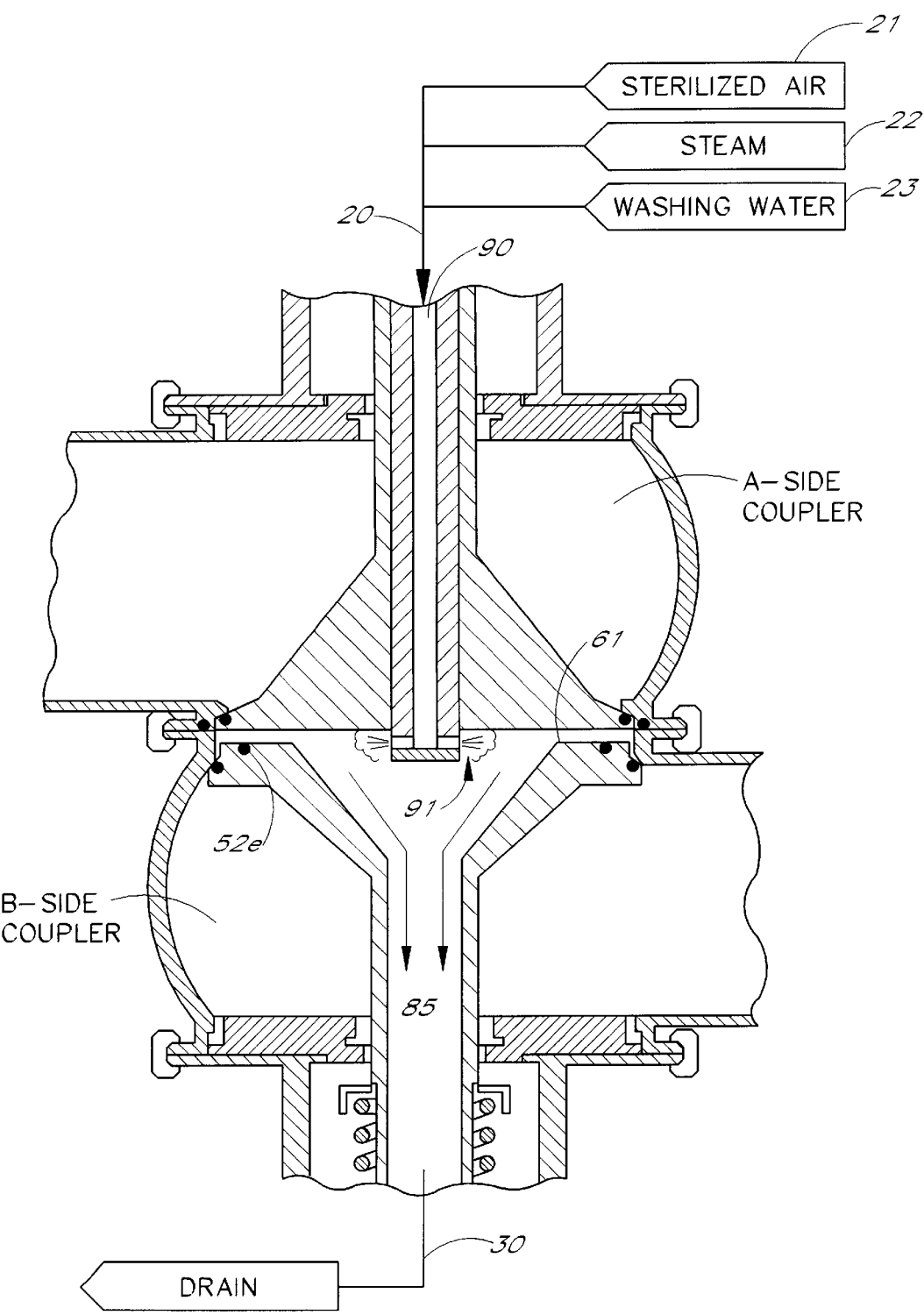
FIG. 7 is a schematic cross-sectional view depicting interfacial washing of the coupler on the side of the unit A and the coupler on the side of the unit B in the automated pipe connection apparatus according to the first embodiment of the present invention.
Figure 8A:
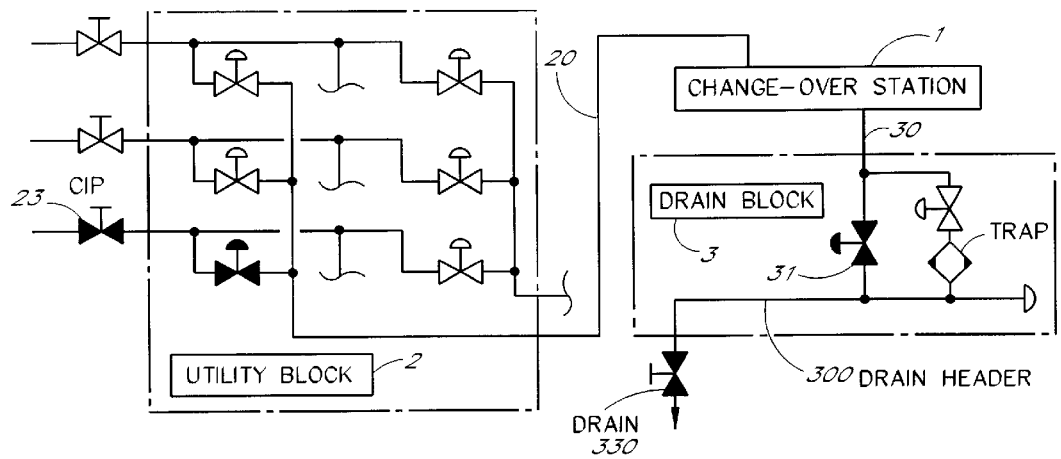
FIG. 8 is a diagram showing flows through a utility block and a drain block system in the automated pipe connection apparatus according to the first embodiment of the present invention.
Figure 8B:
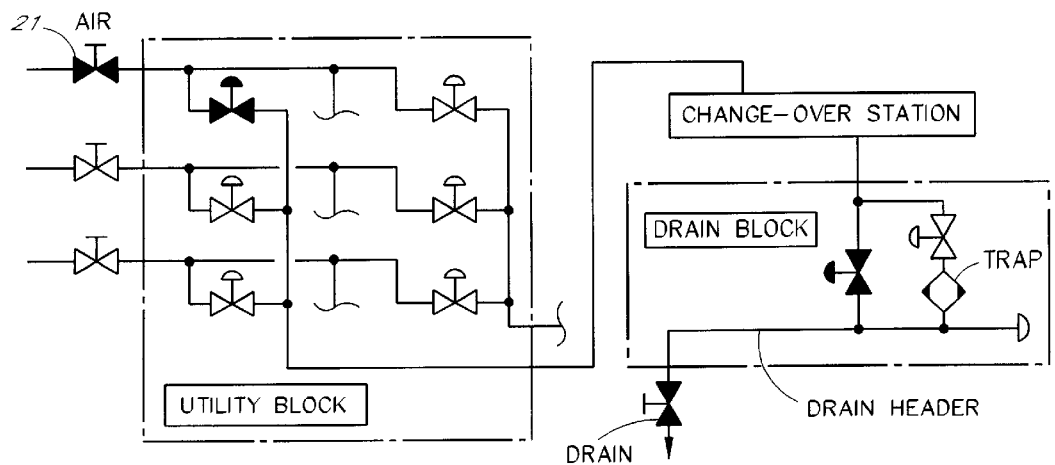
Figure 8C:
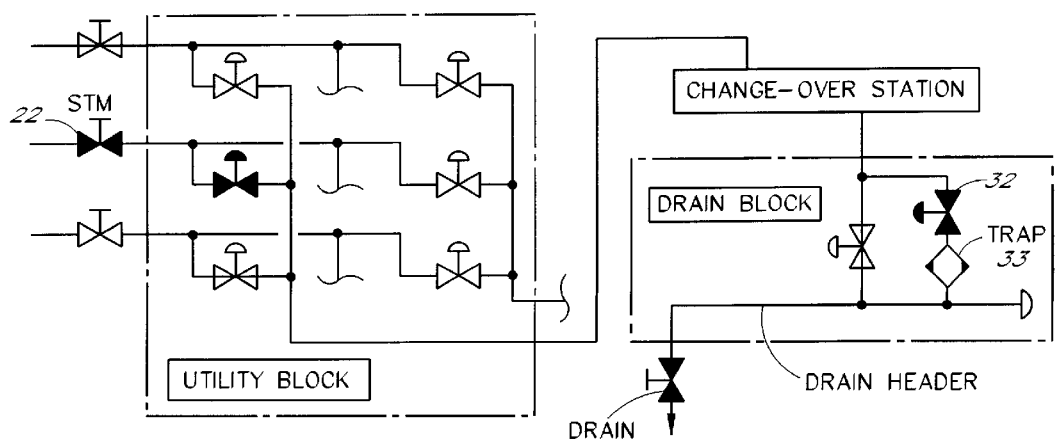
Figure 8D:
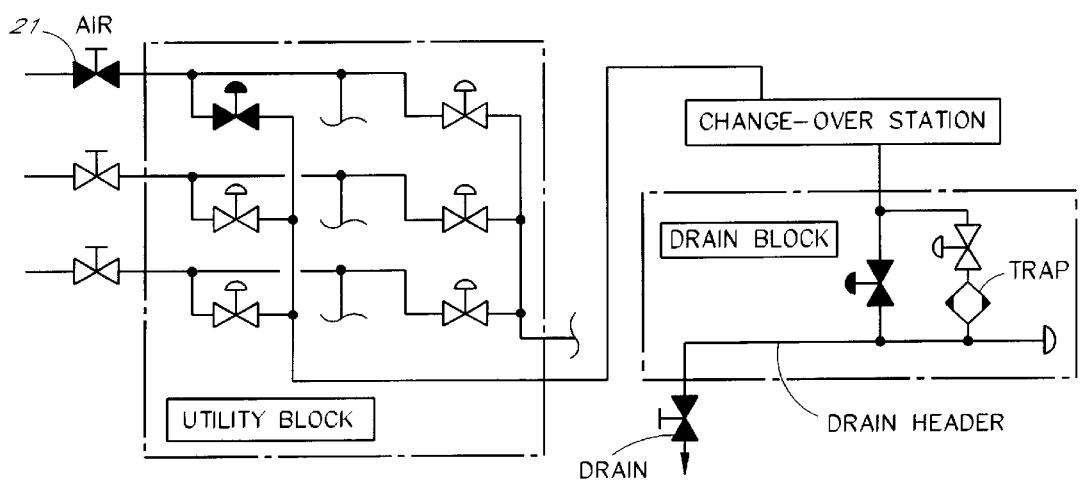

After completion of a necessary delivery, the feeding of air to the pneumatic cylinder is stopped so that the valve elements are allowed to return to their original positions (FIG. 7).

Utility Block (2)

The utility block 2 for feeding utility to achieve CIP and SIP is constructed as shown in FIG. 1. In this embodiment, the utility block 2 is constructed of a washing water feed pipe, a steam feed pipe, and a sterilized air feed pipe. Each pipe can be connected at a free end thereof to the spraying means of each coupler, each cap and the opening of the washing- and sterilizing-purpose coupler. If necessary, it is also possible to additionally arrange a rinsing pipe and/or a utility pipe such as a nitrogen gas pipe, which may also be required for washing and sterilization.

The utility block 2 is desirably arranged at a position higher than the drain block 3 to avoid liquid holdup. To minimize the amount of a liquid which may remain in each pipe of the utility block, it is preferred to allocate the individual pipes for the sterilized air 21, the steam 22 and the washing water 23 in the order of from the top to the bottom in the utility block although the present invention is not limited thereto.

The utility block 2 is connected, for example, via hoses 20 to the side of the automated pipe connection apparatus 1 where CIP and SIP are desired.

The hose can be selected in view of pressures and temperatures during CIP and SIP. It is preferred to select it from hoses having sanitation performance. When the sterilized air 21, the steam 22 or the washing water 23 is needed, its delivery is conducted by operating, for example, a directional control valve 210, 220 or 230. These directional control valves can be chosen from commercial products by taking the sizes, fluid temperatures, sanitation performance and the like into consideration.

Drain Block (3)

To discharge steam and washing water, the drain block 3 is arranged as shown in FIG. 1. This drain block comprises drain pipes connected to the funnel-shaped valve elements 49 of the couplers, caps for covering the opposing couplers, drain pipes connected to the caps, and drain pipes connected to the discharge ports of the washing- and sterilizing-purpose couplers. The caps 111,112 can be connected to the movable carriages of the automated connection apparatus so that the caps are arranged movably. As an alternative, the positions of the caps can be fixed without any problem.

The individual drain pipes 30 are connected to a drain header 300 to discharge steam and washing water to an external drain.

Upon steam sterilization, steam from the utility block 2 is caused to flow, for example, through the movable carriage A1(11), the cap 111 and the drain pipe 30. After a predetermined time has elapsed, a valve 31 is closed and in order to raise the temperature to a preset level, a valve 32 arranged above a steam trap 33 is opened. This makes it possible to discharge steam through the steam trap and at the same time, to maintain a sterilizing temperature. Upon draining washing water, the valve 32 is closed and the washing-water discharge valve 31 is opened. Such steam traps and valves can be selected from those available on the market in view of the temperature of effluent and the like. It is preferred to arrange the drain block at a position lower than the automated connection means 1 and further to make the pipes slope down in a down-stream direction for the prevention of liquid holdup. It is also possible to use sterilized air to discharge any remaining liquid.

Washing and Sterilizing Method

FIG. 7 illustrates a situation in which the interface is washed and sterilized using the washing and sterilization chamber 90. In this situation, supply of air to the internal valve drive actuator 1900, which is arranged on the upper end portion of the valve stem 58 of the upper coupler 25, has been stopped.

Inside the valve stem, the washing and sterilization chamber 90 is arranged concentrically. To the space of this chamber, the sterilized air 21, the steam 22 and the washing water 23 are fed via the hose 20. The sterilized air 21, the steam 22 and the washing water 23 are sprayed out through the spraying means (nozzle) 91 arranged at the free end of the chamber. As the spraying means, there are a variety of examples, including a mechanism making use of narrow slits, a mechanism making use of small holes formed obliquely, and a mechanism with small holes bored in tangential directions to spray each fluid in the form of a swirl.

As an illustrative example of the feeding sequence, the washing water 23 which has been fed under pressure is sprayed through the spraying means 91 to wash the seal 52e, which seals up the upper and lower valve elements together, and an internal-valve contacting surface 61. The washing water is then discharged to a drain via the funnel-shaped central hollow space 85, which is arranged inside the lower valve element, and the drain pipe 30 connected to the drain block 3. At the drain block 3, the drain valve 31 is opened before feeding the washing water 23.

To expel the washing water 23, the sterilized air 21 is then fed from the utility block 2, followed by the feeding of the steam 22 for sterilization. Prior to feeding the steam 22, the drain valve 31 is closed in the drain block 3. Because the steam trap 33 as means for extracting steam condensate is used during SIP, the valve 31 is kept open only for a predetermined time to allow the steam flow therethrough and is then closed, and the valve 32 arranged above the steam trap 33 is thereafter opened. Finally, the valve 32 arranged above the steam trap 33 is closed and the drain valve 31 is opened. The sterilized air 21 is then fed from the utility block 2 to purge steam given off during the steaming. FIG. 8 shows an operation sequence (FIG. 8a through FIG. 8d), in which the valves fully painted in black indicate that they are open.

The operation sequence is to perform interfacial CIP (Cleaning in Place) and interfacial SIP (Sterilization in Place). Since washing and sterilization are performed before disconnection, this operation sequence does not contaminate a surrounding area and moreover, the interface itself has been sterilized. It is therefore possible to prevent proliferation of sundry bacteria. Needless to say, these operations can be conducted before delivering a raw material, an intermediate product or the like.

After that, the fastening by the half clamp 35 for the above-described mechanical holding is released to allow disconnection.

Figure 9:
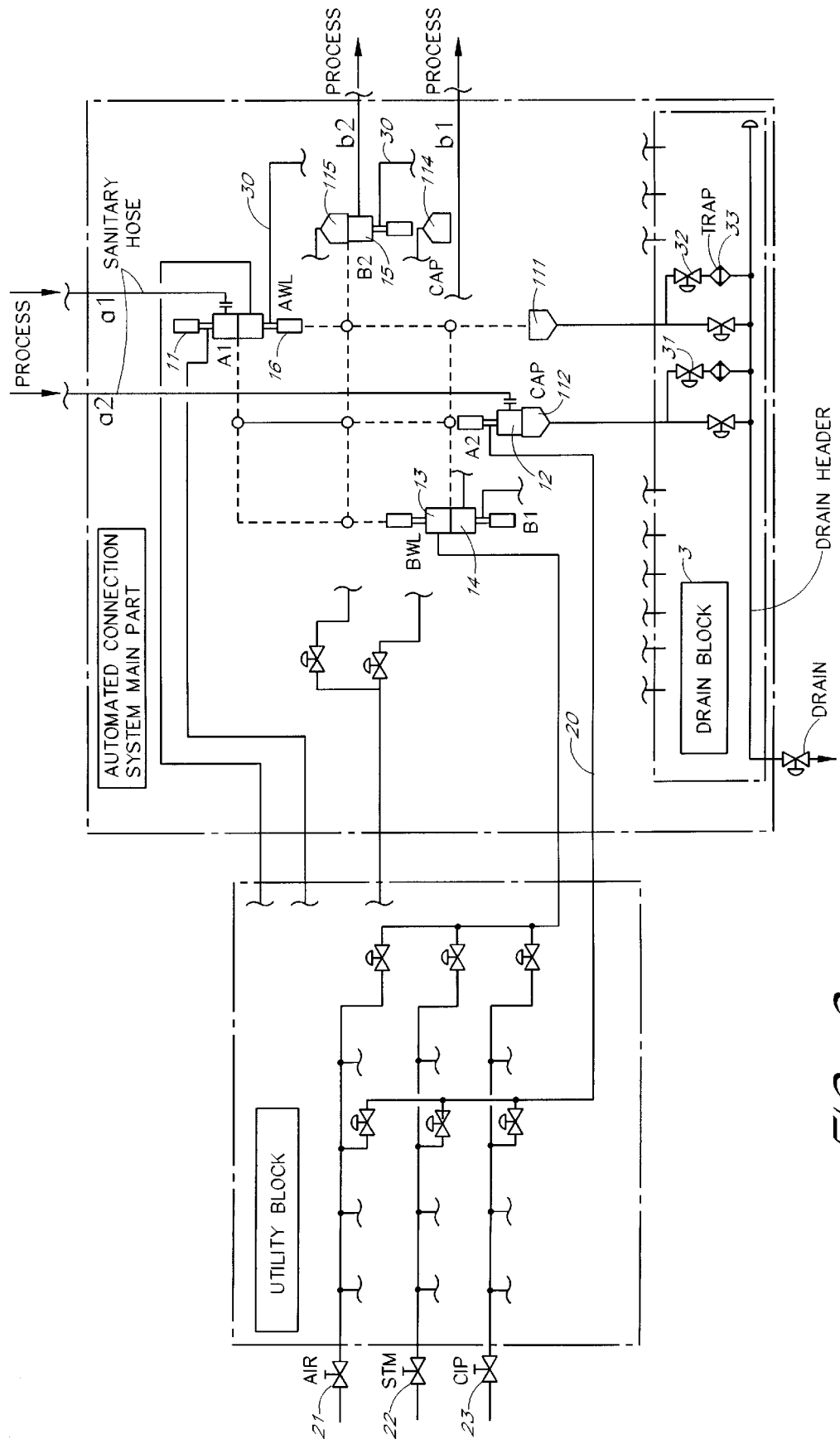
FIG. 9 is a schematic diagram illustrating an overall arrangement of the automated pipe connection apparatus according to the first embodiment of the present invention upon connection of a washing-purpose coupler for the unit A with a coupler on the side of the unit A and connection of a washing-purpose coupler for the unit B with a coupler on the side of the unit B.

FIG. 9 is an overall layout showing connections for performing washing and sterilization of the pipes a1,b1 at the same time.

Needless to say, it is possible to independently connect the couplers of the movable carriages A1(11),B1(14) to the washing- and sterilizing-purpose coupler AWL(16) or BWL (13) so that the interiors of the associated pipes can be independently washed and sterilized. A description will hereinafter be made in detail.

Figure 11:
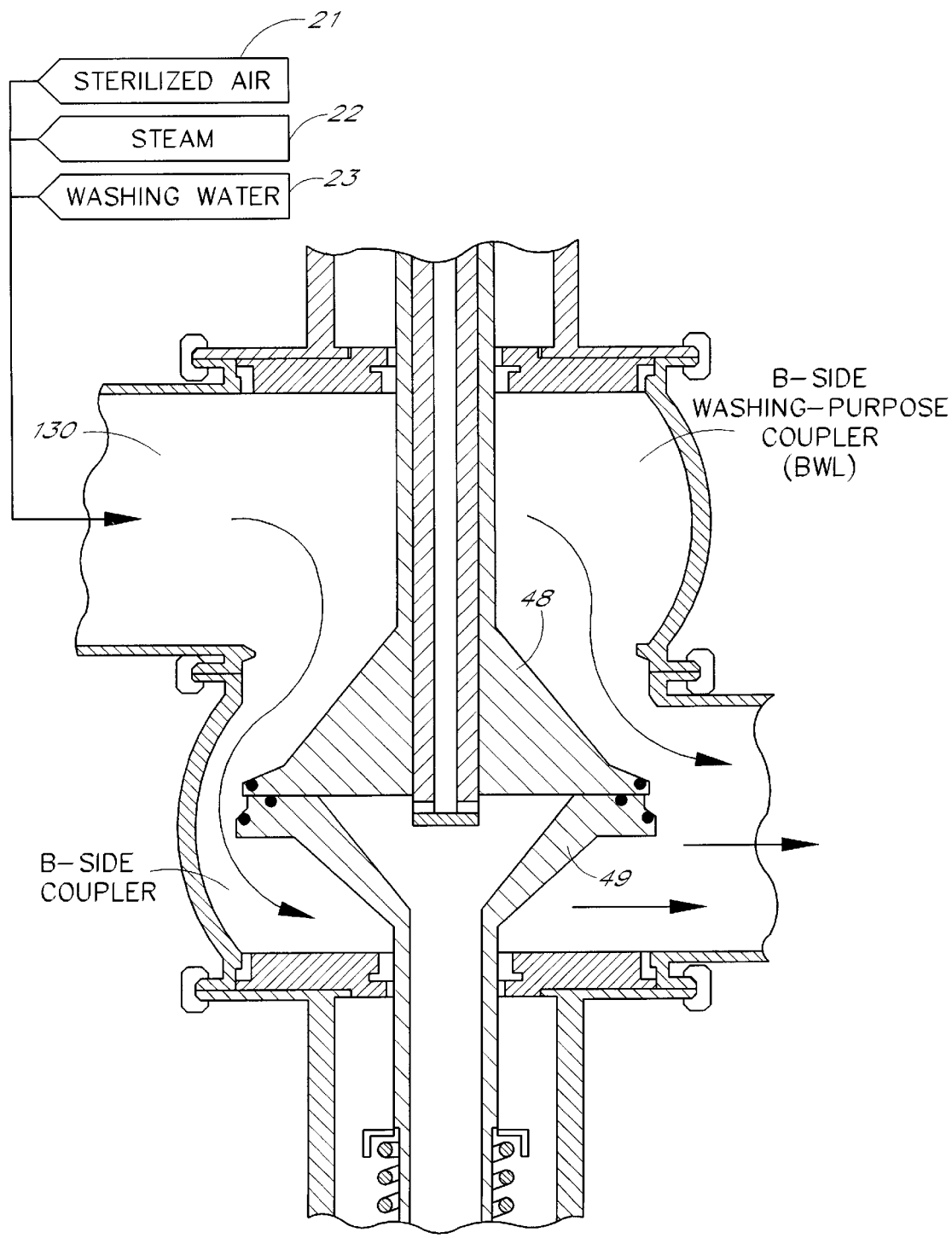
FIG. 11 is a schematic cross-sectional view depicting a state in which a fluid is flowing as a result of connection between the washing-purpose coupler for the unit B and a coupler on the side of the unit B in the automated pipe connection apparatus according to the first embodiment of the present invention.
Figure 12A:
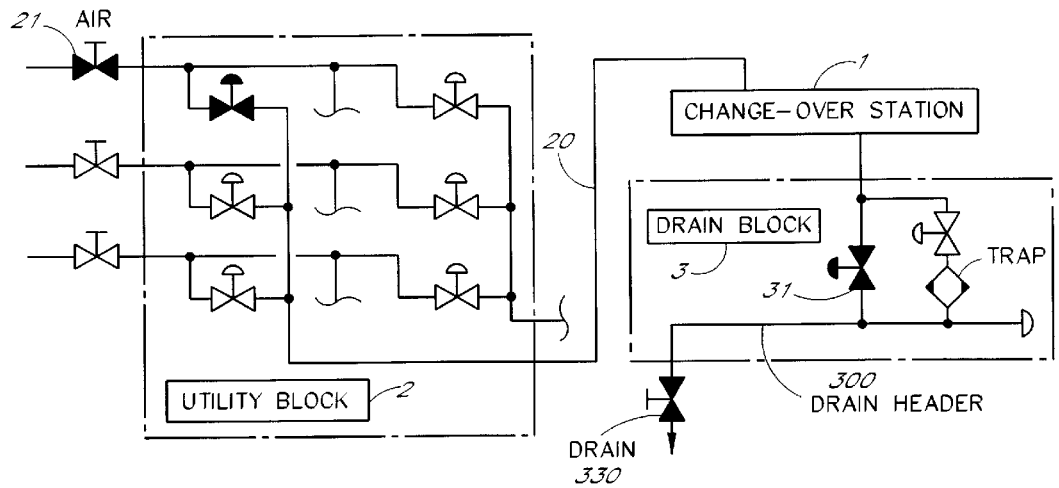
FIG. 12 is a diagram showing different examples of flow pattern through the utility block and the drain block apparatus with the automated pipe connection apparatus according to the present invention.
Figure 12B:
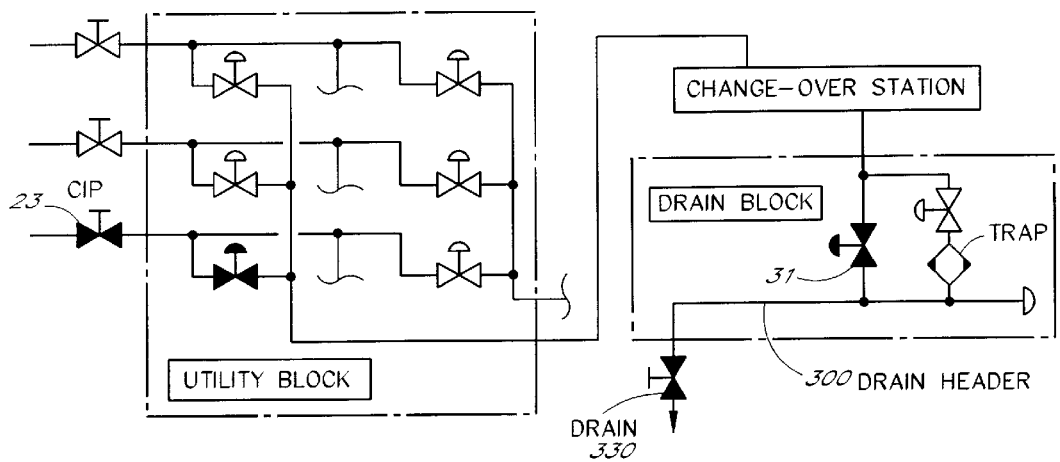
Figure 12C:
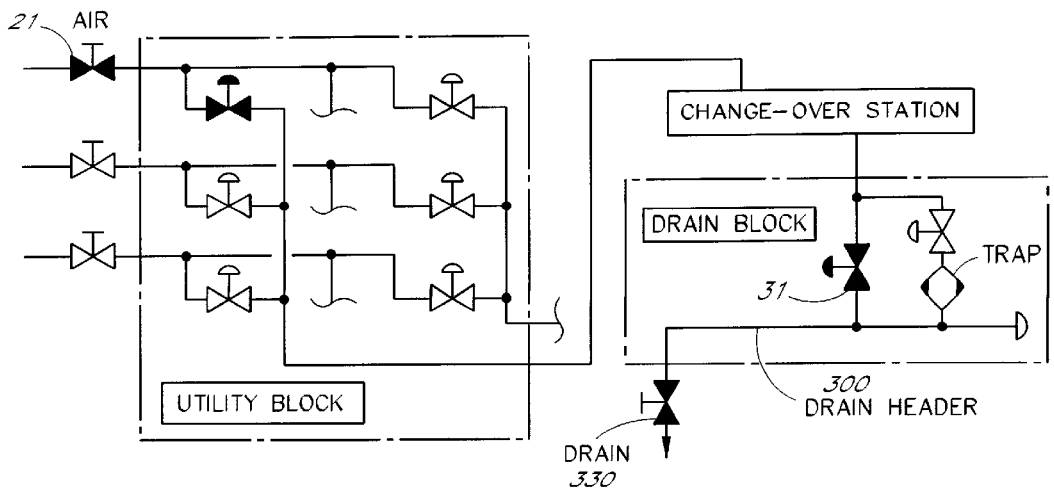
Figure 12D:
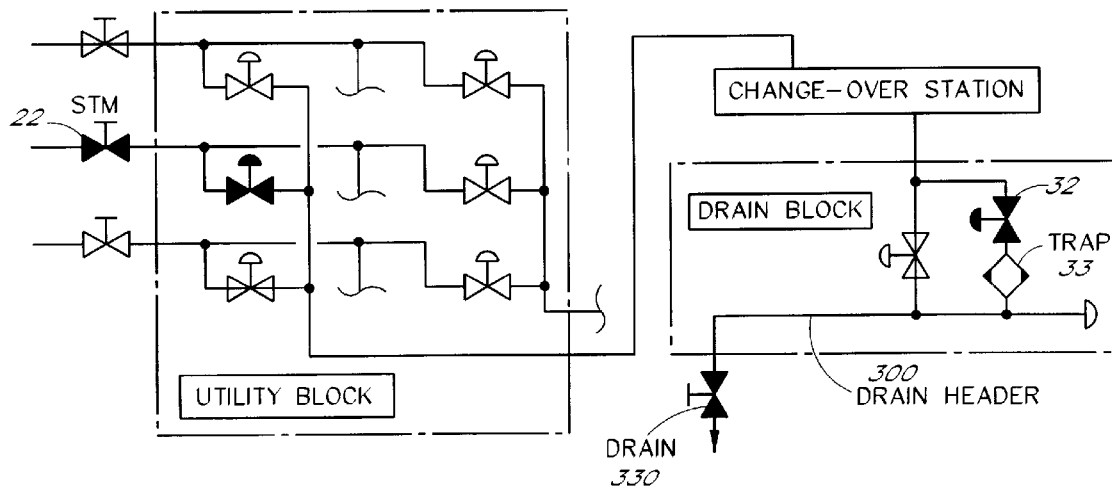
Figure 12E:
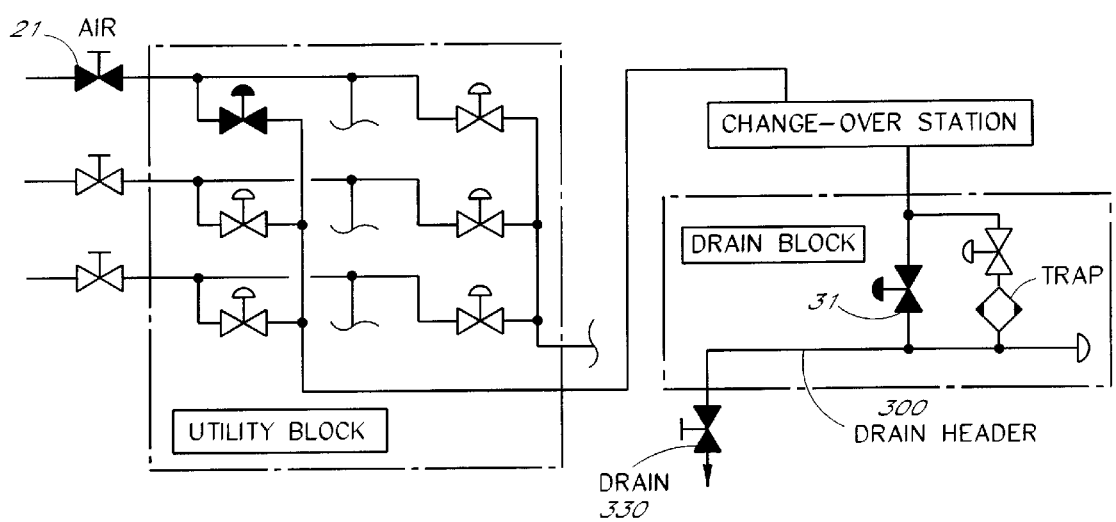

After transferring through the pipes a1,b1 is finished, the contacting surfaces of the couplers of the movable carriages A1(11),B1(14) are subjected to washing and sterilization by interfacial CIP and SIP. The couplers are then disconnected from each other, and the pipes through which a fluid was delivered are subjected to internally washing and sterilizing. For this purpose, the coupler A1(11) of the pipe a1 is connected to the washing- and sterilizing-purpose coupler AWL(16) for the unit A. The washing- and sterilizing-purpose coupler AWL(16) for the unit A is provided in the shell portion thereof with a port 160 formed exclusively for the sterilized air 21, the steam 22 and the washing water 23, all of which are fed from the utility block. At the same time, to wash and sterilize the pipe b1 in a similar manner, the coupler B1(14) is connected to the washing- and sterilizing-purpose coupler BWL (13) for the unit B (FIG. 11). The washing- and sterilizing-purpose coupler BWL(13) for the unit B is provided in the shell portion thereof with a port 130 formed exclusively for the sterilized air 21, the steam 22 and the washing water 23, all of which are fed from the utility block.

Figure 10:
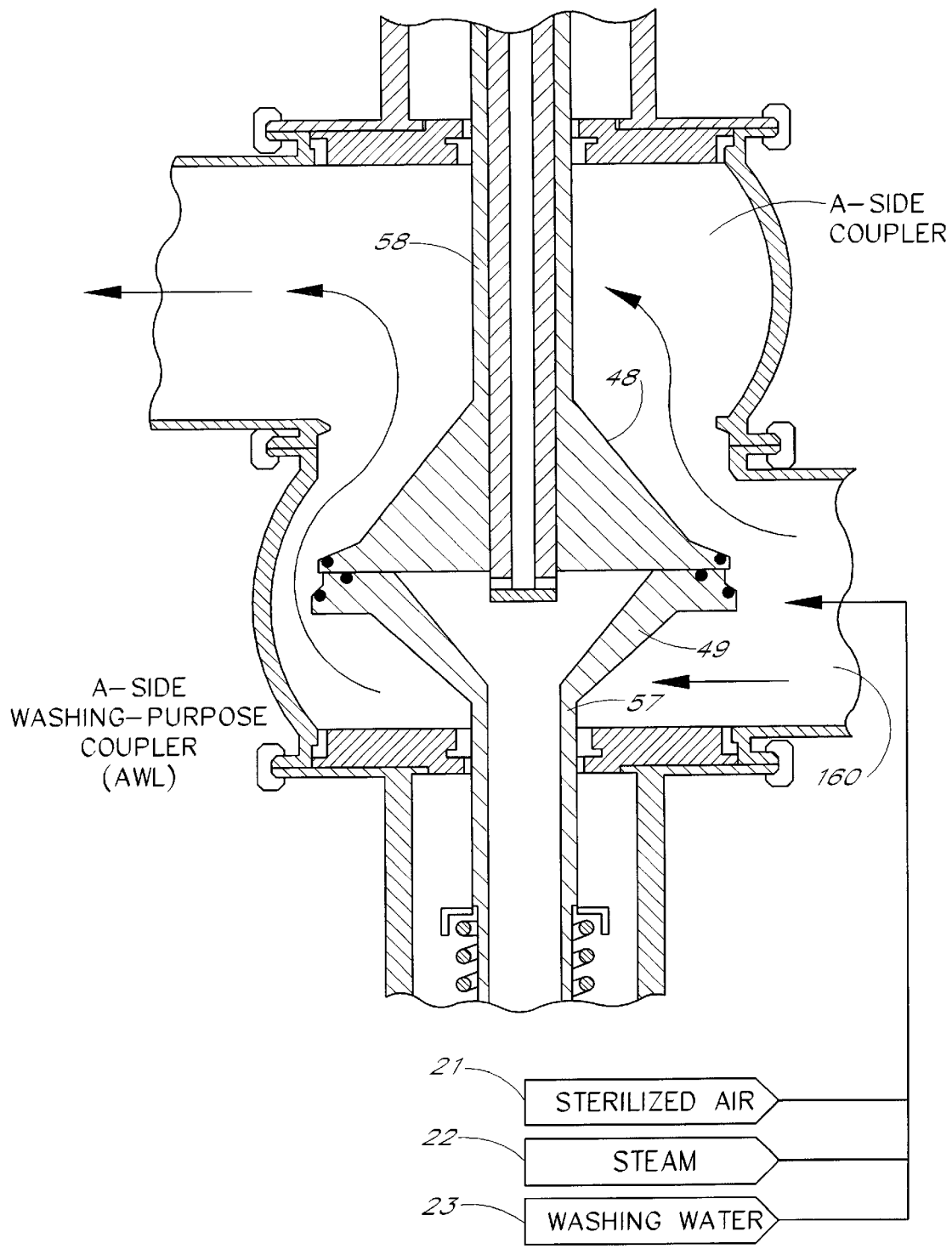
FIG. 10 is a schematic cross-sectional view depicting a state in which a fluid is flowing as a result of connection between the washing-purpose coupler for the unit A and a coupler on the side of the unit A in the automated pipe connection apparatus according to the first embodiment of the present invention.

A washing and sterilizing method of the interior of the pipe a1 will next be described with reference to FIGS. 10 and 12. Positioning and connecting methods are the same as those employed upon conducting connection between the coupler of the movable carriage A1(11) and the coupler of the movable carriage B1(14).

The washing- and sterilizing-purpose coupler AWL(16) and the coupler of the movable carriage A1(11) are connected together. From the utility block 2, the sterilized air 21, the steam 22 and the washing solution 23 are caused to flow through the flow passage in the pipe a1 so that the pipe is internally washed and sterilized. For example, CIP and SIP are performed in accordance with the following procedures.

To recover or discharge any liquid product still remaining in the pipe a1, the pipe a1 is scavenged by feeding the sterilized air 21 from the utility block 2 through the washing- and sterilizing-purpose coupler AWL(16) and the coupler of the movable carriage A1(11). The washing water 23 is then fed from the utility block 2. After completion of the washing of the inside of the pipe a1, the sterilized air 21 is fed into the pipe a1 from the utility block 2 to scavenge the washing water 23, so that any remaining washing water is removed from the inside of the pipe.

For sterilization, the steam 22 is then fed from the utility block 2. Subsequent to completion of the sterilization of the inside of the pipe a1, the sterilized air 21 is fed from the utility block 2 to discharge any remaining steam condensate. The pipe is hence scavenged so that the remaining steam condensate no longer remains inside of the pipe a1. It is of course possible to feed the sterilized air 21 from the utility block 2 so that through the washing- and sterilizing- coupler AWL(16) and the coupler of the movable carriage A1(11), the inside of the pipe is filled up with the sterilized air 21 to maintain the inside of the pipe in the sterilized state.

In accordance with procedures similar to those described above, washing and sterilization of the inside of the pipe b1 can be achieved either simultaneously or independently (FIG. 11).

Figure 13:
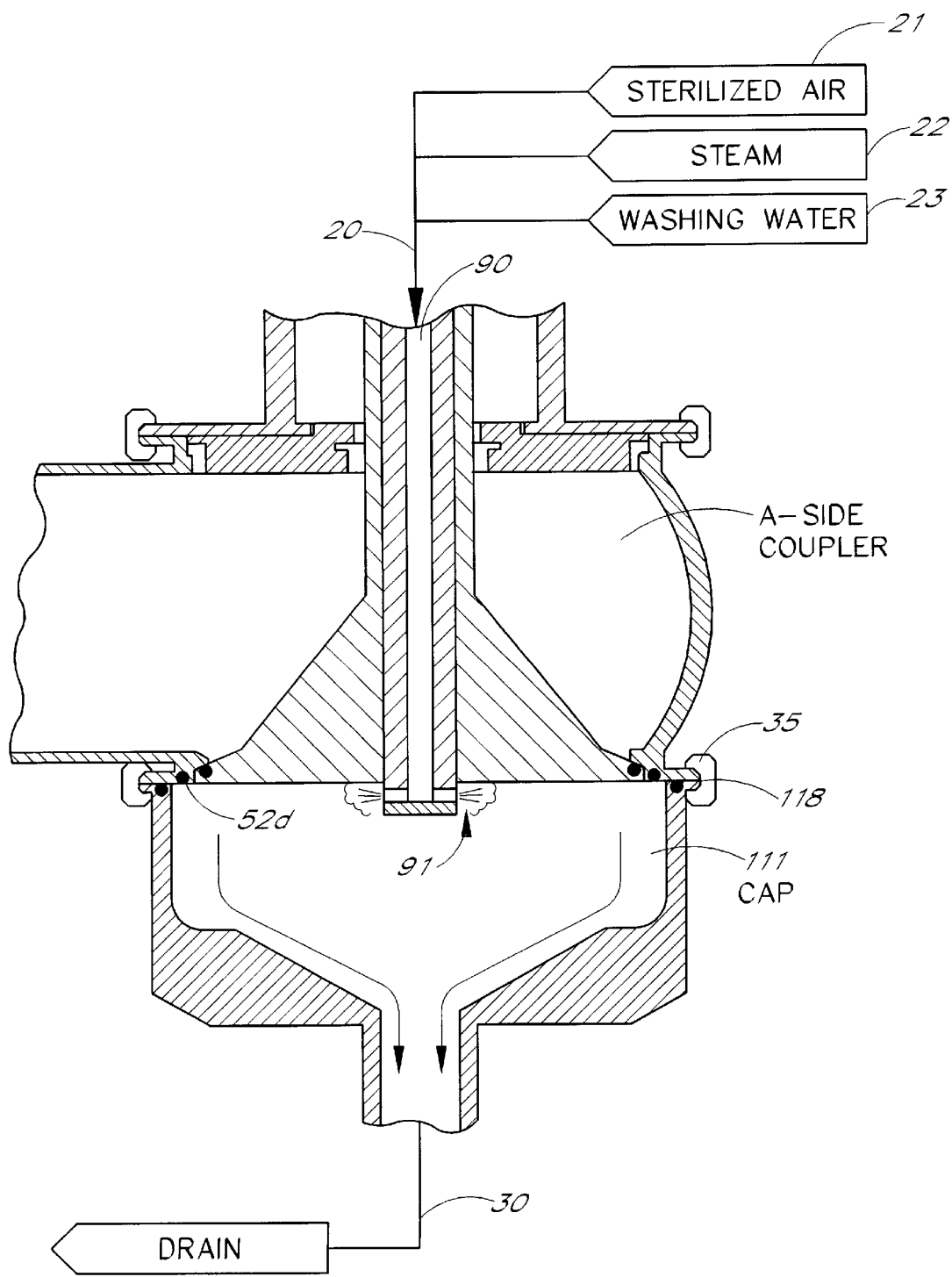
FIG. 13 is a schematic cross-sectional view illustrating a state in which a cap, which is for couplers on the side of the unit A, has been applied to one of the couplers on the side of the unit A in the automated pipe connection apparatus according to the first embodiment of the present invention.

FIG. 13 is a schematic diagram of the coupler of the upper movable carriage A1(11) and the cap 111 for the upper coupler. To seal up a fluid flow passage upon connection of the upper spherical shell with the lower spherical shell, the O-ring 52d is arranged in the bevel portion 52b of the spherical shell. This portion is the place with which the fluid was in contact, and thus requires washing. The above-described interfacial washing which is performed before disconnection is not possible for itself to wash there. To wash the O-ring (primary seal) and the inside thereof, the coupler of the movable carriage A1(11) is connected at the home position thereof to the cap 111 arranged exclusively for the coupler. This connection is made by the drive unit provided on the side of the cap. The cap is pressed under an appropriate pressing force to establish sealing, and washing is then conducted. This cap is pressed against an edge portion of the bevel portion of the spherical shell, said edge portion being located on an outer side of the O-ring 52d.

Accordingly, the inner diameter of the cap is set greater than the outer diameter of the O-ring 52d as arranged. The cap is provided at a lower part thereof with the drain pipe 30 which communicates to the drain block 3. To establish sealing between the cap and the upper coupler, an O-ring 118 is provided in an outer edge portion of the lower cap at a location facing the upper coupler. Further, the upper coupler and the cap are mechanically locked together by the clamp 35.

Owing to the capping device, it is possible to allow a small amount of steam to flow in even when the coupler is at the home position and is on standby. This can prevent sundry bacteria in the atmosphere from entering through the sealed portion of the coupler.

Figure 14:
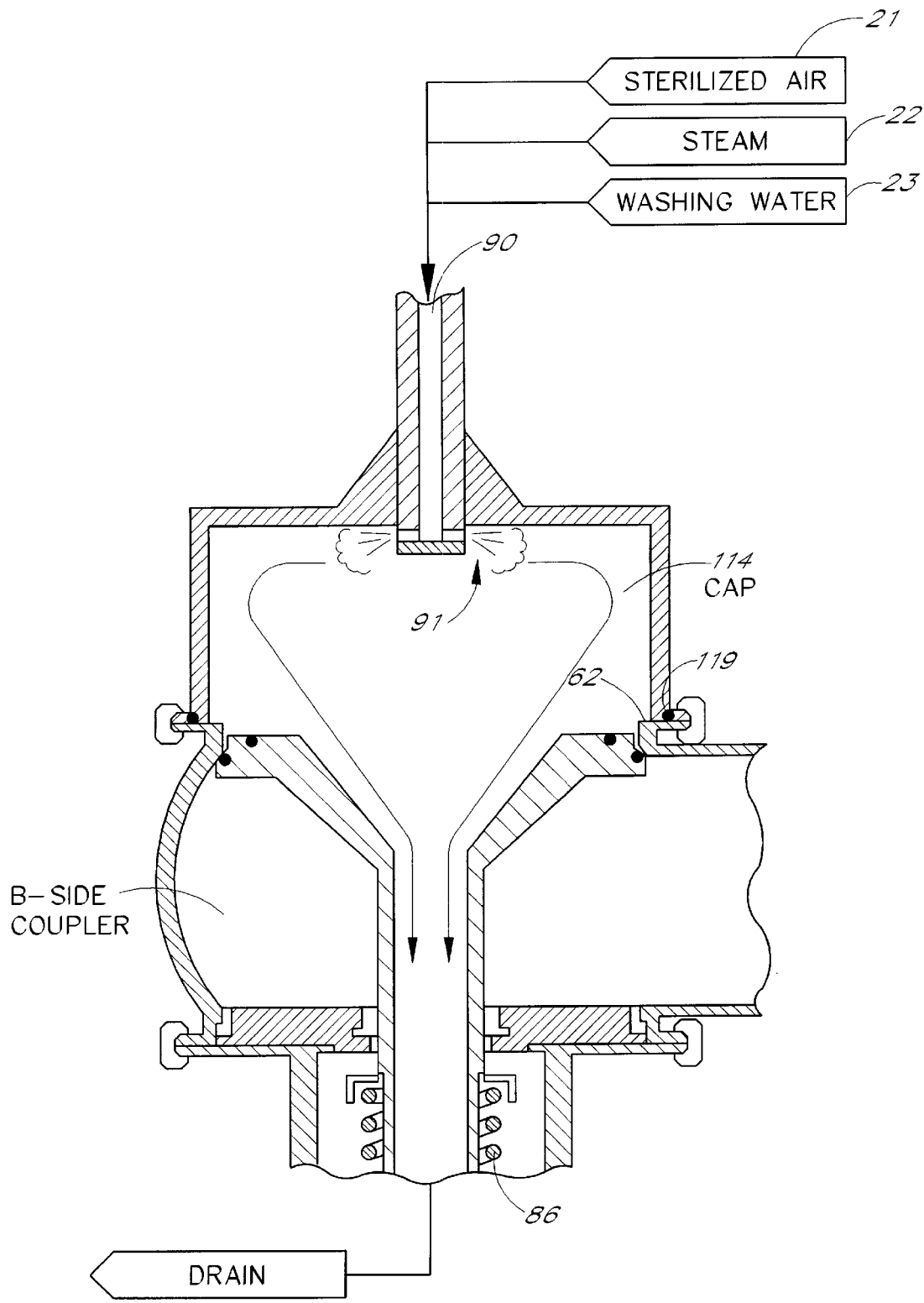
FIG. 14 is a schematic cross-sectional view illustrating a state in which a cap, which is for couplers on the side of the unit B, has been applied to one of the couplers on the side of the unit B in the automated pipe connection apparatus according to the first embodiment of the present invention.
Figure 15:
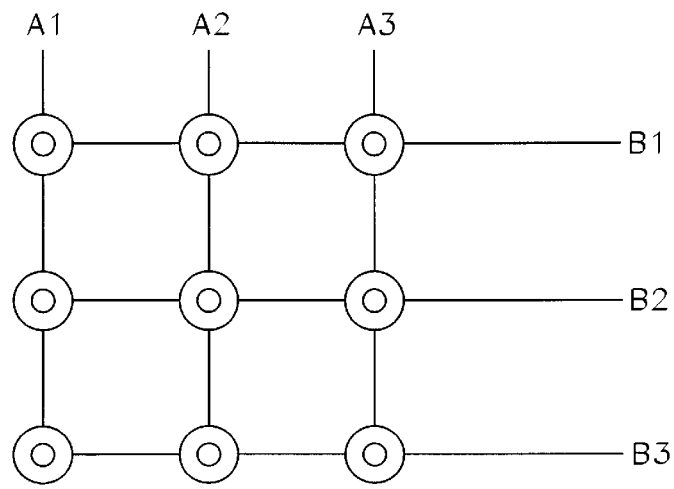
FIG. 15 is a schematic illustration showing a conventional example of connection of pipes.
Figure 16:
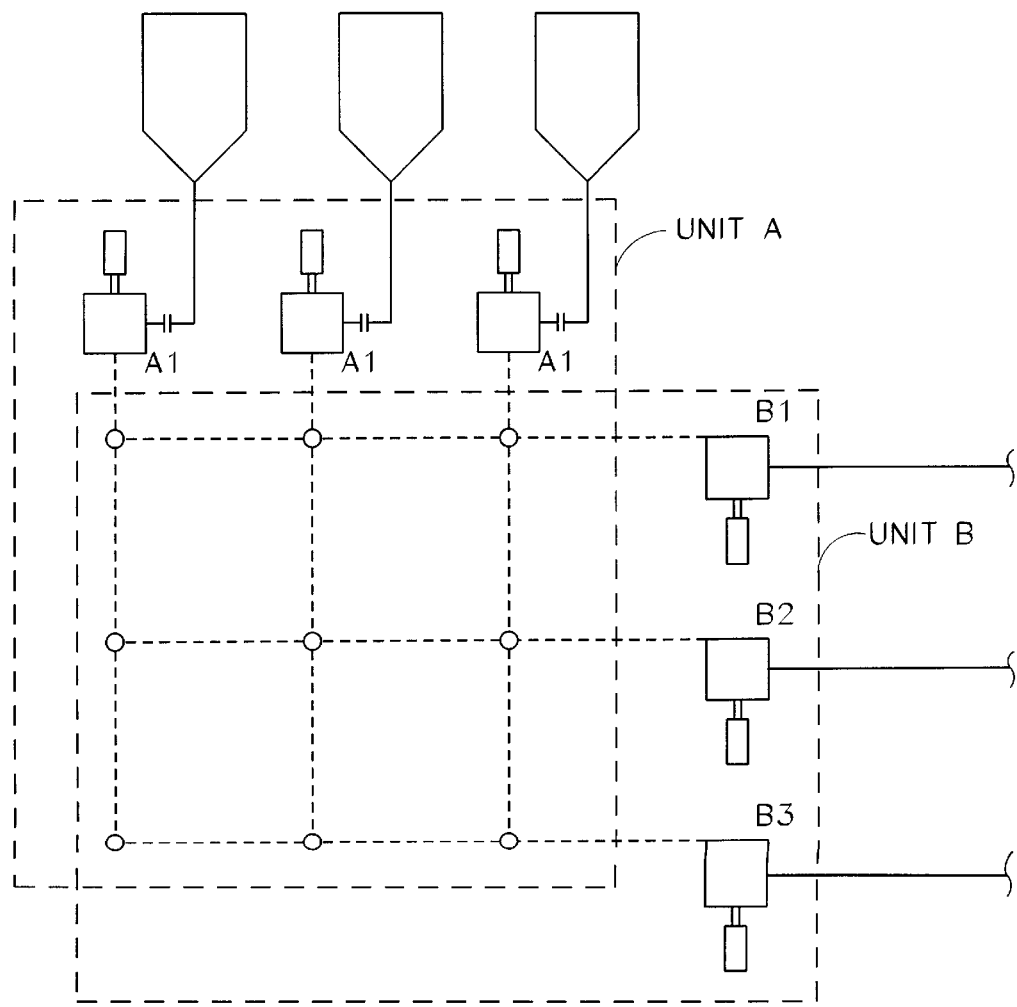
FIG. 16 is a schematic layout depicting the conventional example of connection of the pipes.

FIG. 14 is a schematic diagram of the coupler of the lower movable carriage B1(14) and the cap 114 for the lower coupler. To wash a contacted portion 62, with which the primary seal 52d was in contact, and the inside thereof, the coupler of the movable carriage B1(14) is brought at the home position thereof into contact with the cap 114 arranged exclusively for the movable carriage B1. This connection is made by the drive unit provided on the side of the coupler of the movable carriage B1. The cap is pressed under an appropriate pressing force, whereby washing is performed while maintaining a sealed state. This cap is pressed against an edge portion of the bevel portion of the spherical shell, said edge portion being located on an outer side of the portion 62d with which the O-ring is brought into contact. Accordingly, the inner diameter of the cap is set greater than the outer diameter of the O-ring 52d as arranged. In an upper part of the cap, the washing and sterilization chamber 90 is arranged in communication with the utility block 2. Through the spraying means 91 arranged at the free end of the chamber, the sterilized air 21, the steam 22 and the washing water 23 are sprayed radially. To be maintained in contact with the upper coupler to establish sealing therebetween, an O-ring 119 is arranged in an outer edge portion of the upper cap at an location facing the lower coupler. Further, the lower coupler and the cap are mechanically locked together by the clamp 35.

The feeding sequence from the utility block 2 and the positions of the valves in the drain block 3 are substantially the same as those described above with reference to FIG. 8 concerning the interfacial washing and sterilization between the couplers.

Washing and sterilization are performed as shown in FIGS. 13 and 14. Sprayed through the spraying means arranged at the free end are the washing water 23 for washing, the sterilized air 21 for scavenging the washing water, the steam 22 for sterilization, and the sterilized air 21 for scavenging any remaining steam condensate in the order that they have been presented.

In this manner, the portion sealed for the formation of a flow passage for the above-described fluids and the seal-contacting portion are washed and sterilized and the washing water is discharged to the drain block 3 through the lower drain pipe 30. Regarding the position of the valve in the drain block 3, the drain valve 31 is opened upon discharge of the washing water and the drain valve 31 is also opened when scavenging with the sterilized air for the elimination of the washing water. Further, upon causing steam to flow for sterilization, the drain valve 31 is closed and to use the steam trap 33, the valve 32 arranged above the trap is opened. Upon completion of the sterilization, the valve 32 arranged above the trap is closed. Upon scavenging any remaining steam condensate with the sterilized air, the drain valve 31 is opened and upon completion of the scavenging, the valve 31 is closed. To maintain the sterilized state, the sterilized air can of course be fed continuously from the utility block with the valves closed in the drain block so that the automated connection apparatus remains filled up with the sterilized air.

Discharge Operation

The feeding sequence from the utility block 2 and the positions of the valves in the drain block 3 are shown in FIG. 12. The valves fully painted in black indicate that they are open. The sterilized air 21 is first caused to flow for driving out a product remaining inside the pipe (FIG. 12a). For washing, the washing water 23 is then caused to flow (FIG. 12b). To eliminate the washing water, scavenging is then conducted with the sterilized air 21 (FIG. 12c). The steam 22 is fed for sterilization (FIG. 12d). Further, any remaining steam condensate is scavenged with the sterilized air 21 (FIG. 12e).

In this sequence, the pipes a1,a2,b1,b2 are internally washed and sterilized through the couplers of the movable carriages A1(11),A2(12),B1(14),B2(15) which are connected to the washing- and sterilizing-purpose couplers AWL(16),BWL(13) by the main body 1 of the automated connection apparatus. The washing water is discharged to the drain block 3 through the funnel-shaped central hollow space 85 arranged inside the lower valve element 49 and the drain pipe 30 disposed underneath the space. Regarding the positions of the valves in the drain block 3, the drain valve is opened upon scavenging with the sterilized air 21 to drive out the liquid remaining in the pipe, the drain valve is opened upon discharging the washing water, and the drain valve 31 is opened upon scavenging with the sterilized air to drive out the washing water. Upon causing the steam 22 to flow for sterilization, the drain valve 31 is closed and to use the steam trap 33, the valve 32 arranged above the trap is opened. Further, the valve 32 above the trap 33 is closed upon completion of the sterilization. The drain valve 31 is opened upon scavenging the remaining steam condensate with the sterilized air 21 but is closed upon completion of the scavenging.

To fill out the pipe with the sterilized air 21, it is of course possible to achieve this filling by feeding the sterilized air 21 from the utility block 2, allowing it to flow through the couplers and then closing he valves 31,32 in the drain block 3.

As soon as the washing and sterilization of the inside of the pipe is completed, the fastening by the half clamp 35 for the above-described mechanical holding is promptly released to achieve disconnection.

The movable carriage A1(11), the coupler AWL(16), the movable carriage B1(14) and the coupler BWL(13) move to their home positions, respectively.

To conduct washing and sterilization of the portion of the O-ring 52d which was sealed to secure a flow passage when the coupler of the movable carriage A1(11) and the coupler of the movable carriage B1(14) were connected together, each of the couplers is connected to its corresponding cap at its home position, followed by washing and sterilization (FIGS. 13 and 14).

Open/close control of the valves in the utility block 2 and that of the valves in the drain block 3 are both carried out by a computer. A combination of washing water, sterilized air and steam can be set so that it becomes optimal for the level of each product. Moreover, even when the couplers in a combination are connected together and a fluid is flowing therethrough, the couplers in the remaining combinations can be connected with their corresponding caps to maintain them in a sterilized state.

(Second Embodiment)

Figure 17:
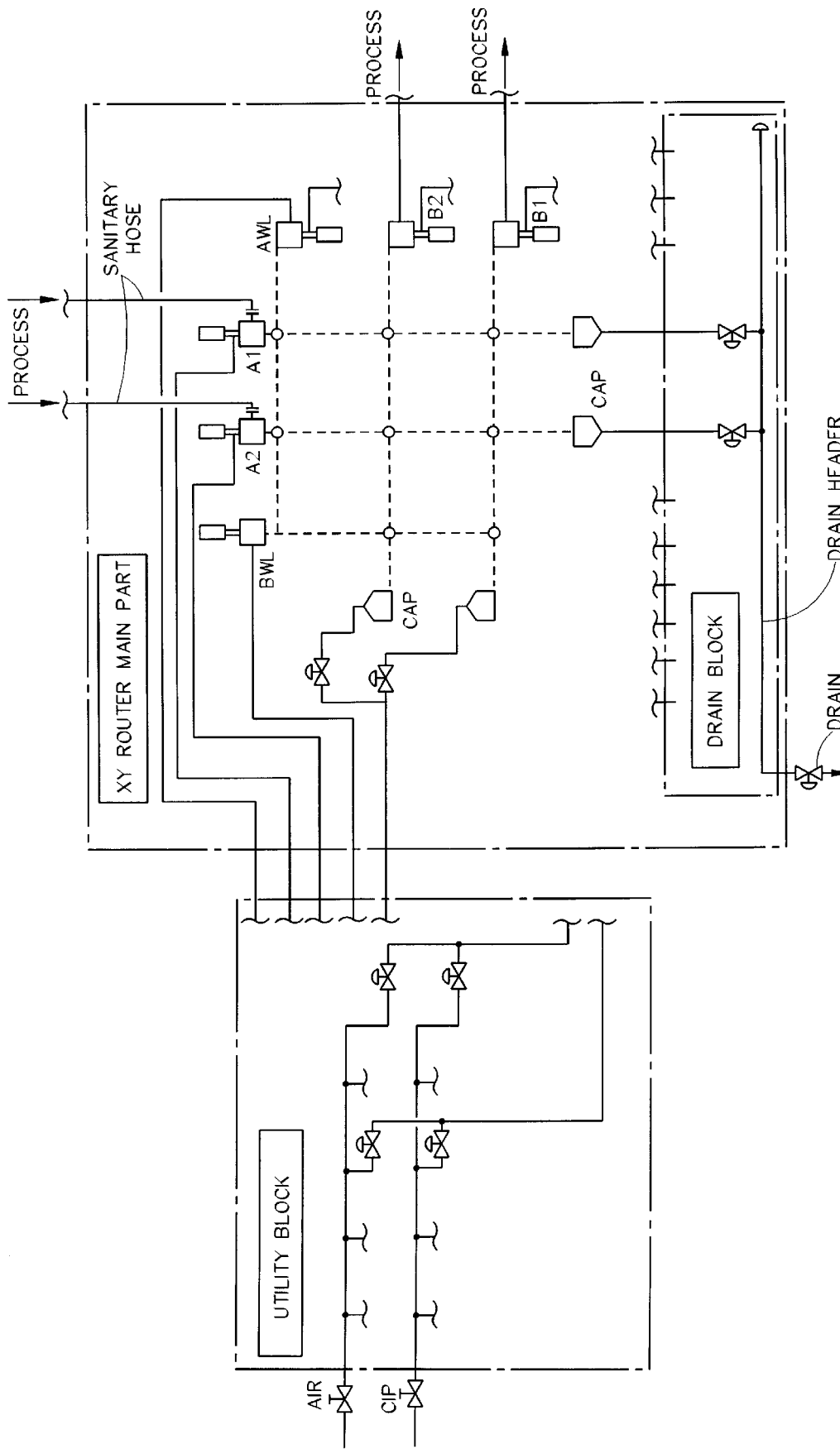
FIG. 17 is an overall schematic layout of the automated pipe connection apparatus according to a second embodiment.

As the first embodiment, the automated connection apparatus for the change-over station which is subjected to washing and sterilization was described. According to the second embodiment, as is illustrated in FIG. 17, a utility block 2 is prepared exclusively for washing and is provided only with an air pipe and a washing water pipe. In a drain block 3, drain pipes are provided with open/close valves through which drains are discharged to a drain header, respectively. The automated pipe connection apparatus according to the second embodiment is an example of an automated pipe connection apparatus for a change-over station for the washing step only. In this embodiment, air is fed to drive out the washing water and is not limited to sterilized air. An The main body 1 of the automated connection apparatus has a construction similar to the main body of the automated connection apparatus according to the first embodiment. Further, an operation method and a coupler connection method are similar to those employed for the first embodiment.

(Third Embodiment)

In each of the first and second embodiments, the utility block 2 is arranged. If utility is needed only for CIP, that is, if utility is washing water alone, arrangement of a washing pipe is only needed and construction of the utility block 2 is not needed. Even in this case, a main body 1 of an automated connection apparatus is constructed as in the first embodiment. Further, an operation method and a coupler connection method are similar to those employed for the first embodiment.

As has been described above, the present invention can provide an automated pipe connection apparatus useful in fields where washing and/or sterilization are needed and having the following characteristic features:

Pipes are physically isolated from each other so that mixing of a product of a different kind can be avoided completely.

Washing and/or sterilizing operations can be flexibly combined and performed in accordance with the required levels of sanitation and sterilization specified for each product.

Pipes in plural combinations can be switched over at the same time.

Even on standby, there is no potential problem of entrance of sundry bacteria through the sealed portion of each coupler.

We claim:

1. A pipe connection apparatus for selectively and temporarily connecting one of a plurality of first stationary pipelines for liquids, to one of a plurality of second stationary pipelines, said apparatus comprising:

unit A comprising:

a plurality of first flexible pipes, each formed into a U-shape with two ends having a Y-axis on a plane, one end of said two ends of each first flexible pipe being adapted to be fixed to a different first stationary pipeline, the other end of said two ends of each first flexible pipe being movable, wherein said first flexible pipes are aligned in a direction where the respective planes thereof are parallel to each other; and a plurality of first movable carriages each having a first coupler, the movable end of each first flexible pipe being connected to a different first movable carriage, wherein the first coupler communicates with the first flexible pipe; each first movable carriage being individually actuated to move in the direction of the Y-axis, wherein the first flexible pipe moves when the movable end thereof connected to the first movable carriage moves together with the first movable carriage; each first coupler having a first inner valve disk for closing the first flexible pipe at said first coupler, said first inner valve disk having an inner passage apart from the first flexible pipe, said inner passage having two ends, one end being open at the first inner valve disk, the other end being adapted to communicate with a treatment pipe;

unit B comprising:

a plurality of second flexible pipes, each formed into a U-shape with two ends having an X-axis on a plane perpendicular to the Y-axis, one end of said two ends of each second flexible pipe being adapted to be fixed to a different second stationary pipeline, the other end of said two ends of each second flexible pipe being movable wherein said second flexible pipes are aligned in a direction where the respective planes thereof are parallel to each other;

a plurality of second movable carriages each having a second coupler, the movable end of each second flexible pipe being connected to a different second movable carriage, wherein the second coupler communicates with the second flexible pipe; each second movable carriage being individually actuated to move in the direction of the X-axis, wherein the second flexible pipe moves when the movable end thereof moves together with the second movable carriage; each second coupler having a second inner valve disk for closing the second flexible pipe at said second coupler, said second inner valve disk having an inner drain passage apart from the second flexible pipe, each second coupler being able to be docked with one of the first couplers when the one is designated, wherein the second inner valve disk is able to be connected to the first inner valve disk of the designated first coupler to communicate said inner drain passage with the inner passage of the first inner valve disk, wherein the first flexible pipe and the second flexible pipe are communicated when the second coupler and the designated first coupler are docked and when the second inner valve disk and the first inner valve disk are open;

a coupler-docking mechanism for docking one of the first couplers and one of the second couplers when both are designated and meet each other when the first and second movable carriages are actuated to move in the Y-axis and X-axis directions, respectively, to selectively connect one of the first stationary pipelines to one of the second stationary pipelines via the first flexible pipe and the second flexible pipe; and a valve disk-controlling mechanism for docking the first inner valve disk of a first coupler and the second inner valve disk of a second coupler when the first coupler and the second coupler are docked to communicate the inner passage with the drain passage, and for opening and closing said first inner valve disk and the second inner valve disk.

2. A pipe connection apparatus according to claim 1, wherein the inner passage of at least one first coupler is adapted to be connected to a system for cleaning or sterilizing the at least one first coupler when the inner passage and the drain passage are communicated.

3. A pipe connection apparatus according to claim 2, further comprising caps, each adapted to be connected to one of said at least one first coupler at the first inner valve disk when the one is designated, said caps leading to a drain.

4. A pipe connection apparatus according to claim 1, further comprising caps having an inner passage connected to a system for cleaning or sterilizing one of the second couplers, said caps being adapted to be connected to the one of the second couplers at the second inner valve disk when designated.

5. A pipe connection apparatus according to claim 1, further comprising a first washing-purpose coupler connected to a system for cleaning or sterilizing one of the second couplers when docked with the first washing-purpose coupler to clean or sterilize the docked second coupler and the second flexible pipe thereof, wherein the first washing-purpose coupler is aligned with the first couplers in the X-axis direction, and the second movable carriages are movable in the X-axis direction to meet the first washing-purpose coupler.

6. A pipe connection apparatus according to claim 1, further comprising a second washing-purpose coupler connected to a system for cleaning or sterilizing one of the first couplers when docked with the second washing-purpose coupler to clean or sterilize the docked first coupler and the first flexible pipe thereof, wherein the second washing-purpose coupler is aligned with the second couplers in the Y-axis direction, and the first movable carriages are movable in the Y-axis direction to meet the second washing-purpose coupler.

7. A pipe connection apparatus for selectively and temporarily connecting one of a plurality of first stationary pipelines for liquids, to one of a plurality of second stationary pipelines, said apparatus comprising:

unit A comprising:
a plurality of first flexible pipes, each having two ends, one end of said two ends of each first flexible pipe being fixed to be connected to a different first stationary pipeline, the other end of said two ends of each first flexible pipe being movable in a first direction; and a plurality of first movable carriages each having a first coupler, the movable end of each first flexible pipe being connected to a different first movable carriage, wherein the first coupler communicates with the first flexible pipe; each first movable carriage being individually actuated to move on a first drive line in the first direction, wherein the first flexible pipe moves when the movable end thereof connected to the first movable carriage moves together with the first movable carriage; said first movable carriages being aligned to render the first drive lines parallel to each other at predetermined intervals; each first coupler having a first inner valve disk for closing the first flexible pipe at the fist coupler, said first inner valve disk having an inner passage apart from the first flexible pipe, said inner passage having two ends, one end being open at the first inner valve disk, the other end being adapted to communicate with a treatment pipe;

unit B comprising:
a plurality of second flexible pipes, each having two ends, one end of said two ends of each second flexible pipe being fixed to be connected to a different second stationary pipeline, the other end of said two ends of each second flexible pipe being movable in the second direction;

a plurality of second movable carriages each having a second coupler, the movable end of each second flexible pipe being connected to a different second movable carriage, wherein the second coupler communicates with the second flexible pipe; each second movable carriage being individually actuated to move on a second drive line in the second direction, wherein the second flexible pipe moves when the movable end thereof moves together with the second movable carriage; said second movable carriages being aligned to render the second drive lines parallel to each other at predetermined intervals and to make the first drive lines and the second drive lines form cross stripes; each second coupler being having a second inner valve disk for closing the second flexible pipe at the second coupler, said second inner valve disk having an inner drain hole apart from the second flexible pipe, each second coupler being able to be docked with one of the first couplers when the one is designated, wherein the second inner valve disk is able to be connected to the first inner valve disk of the designated first coupler to communicate said inner drain hole with the inner passage of the first inner valve disk, wherein the first flexible pipe and the second flexible pipe are communicated when the second coupler and the designated first coupler are docked and when the second inner valve disk and the first inner valve disk are open;

a coupler-docking mechanism for docking one of the first couplers and one of the second couplers when both are designated and meet each other when the first movable carriage is actuated to move on the first drive line in the first direction and the second movable carriage is actuated to move on the second drive line in the second direction, to selectively connect one of the first stationary pipelines to one of the second stationary pipelines via the first flexible pipe and the second flexible pipe; and a valve disk-controlling mechanism for docking the first inner valve disk of a first coupler and the second inner valve disk of a second coupler when the first coupler and the second coupler are docked to communicate the inner passage with the drain passage, and for opening and closing said first inner valve disk and the second inner valve disk.

* * * * *